United States Patent [19]
Ciarcia

[11] Patent Number: 6,109,614
[45] Date of Patent: Aug. 29, 2000

[54] REMOTE SENSING APPARATUS OF SUPERSONIC PROJECTILE

[75] Inventor: Christopher A. Ciarcia, Los Alamos, N. Mex.

[73] Assignee: Tardis Systems, Inc., Los Alamos, N. Mex.

[21] Appl. No.: 08/895,649

[22] Filed: Jul. 17, 1997

Related U.S. Application Data

[60] Provisional application No. 60/022,553, Jul. 19, 1996.

[51] Int. Cl.⁷ .................................................. G06F 15/20
[52] U.S. Cl. .............................. 273/372; 273/371; 434/1; 434/9; 235/400
[58] Field of Search ...................... 273/371, 372; 367/906; 235/400, 412; 434/1, 6, 9, 15

[56] References Cited

U.S. PATENT DOCUMENTS

| | | |
|---|---|---|
| Re. 32,123 | 4/1986 | Knight . |
| 2,925,582 | 2/1960 | Mattei et al. . |
| 3,445,808 | 5/1969 | Johnson .................................. 367/127 |
| 3,489,413 | 1/1970 | Groder et al. . |
| 3,778,059 | 12/1973 | Rohrbaugh et al. . |
| 4,222,564 | 9/1980 | Allen et al. .............................. 273/369 |
| 4,261,579 | 4/1981 | Bowyer et al. . |
| 4,281,241 | 7/1981 | Knight et al. . |
| 4,282,453 | 8/1981 | Knight et al. . |
| 4,307,292 | 12/1981 | Knight et al. . |
| 4,349,728 | 9/1982 | Phillips et al. . |
| 4,350,882 | 9/1982 | Phillips . |
| 4,357,531 | 11/1982 | Knight . |
| 4,425,500 | 1/1984 | Knight et al. . |
| 4,514,621 | 4/1985 | Knight et al. . |
| 4,885,725 | 12/1989 | McCarthy et al. . |
| 5,025,424 | 6/1991 | Rohrbaugh et al. . |
| 5,095,433 | 3/1992 | Botarelli et al. . |
| 5,247,488 | 9/1993 | Borberg et al. . |
| 5,349,853 | 9/1994 | Oehler . |
| 5,447,315 | 9/1995 | Perkins .................................... 273/371 |
| 5,504,717 | 4/1996 | Sharkey . |

*Primary Examiner*—Valencia Martin-Wallace
*Assistant Examiner*—John M Hotaling, II
*Attorney, Agent, or Firm*—Jeffrey D. Myers; Deborah A. Peacock; Andrea L. Mays

[57] ABSTRACT

A remote targeting apparatus and method comprising surrounding a projectile target with a sensor array, computing projectile impact data, transmitting the data receiving the data at a controller; and displaying information corresponding to the data. RF transmission/reception is performed, most preferably at a frequency of between approximately 902 and 928 MHz, with the controller having RF Faraday cage shielding and collision avoidance being employed to permit multiple sensor arrays to operate in a vicinity of one another. Projectile impact locations within twelve inches of the center of the projectile target are calculated to an average RMS accuracy of less than approximately fifty thousandths of an inch, directly in an orthogonal Cartesian coordinate system. Velocity is also determined via an additional sensor at a predetermined distance from the sensor array which measures a difference in time between the projectile passing the additional sensor and the sensor array. The preferred sensor array has at least two pairs of acoustical sensors, with an additional acoustical transducer orthogonal to the two pairs.

58 Claims, 47 Drawing Sheets

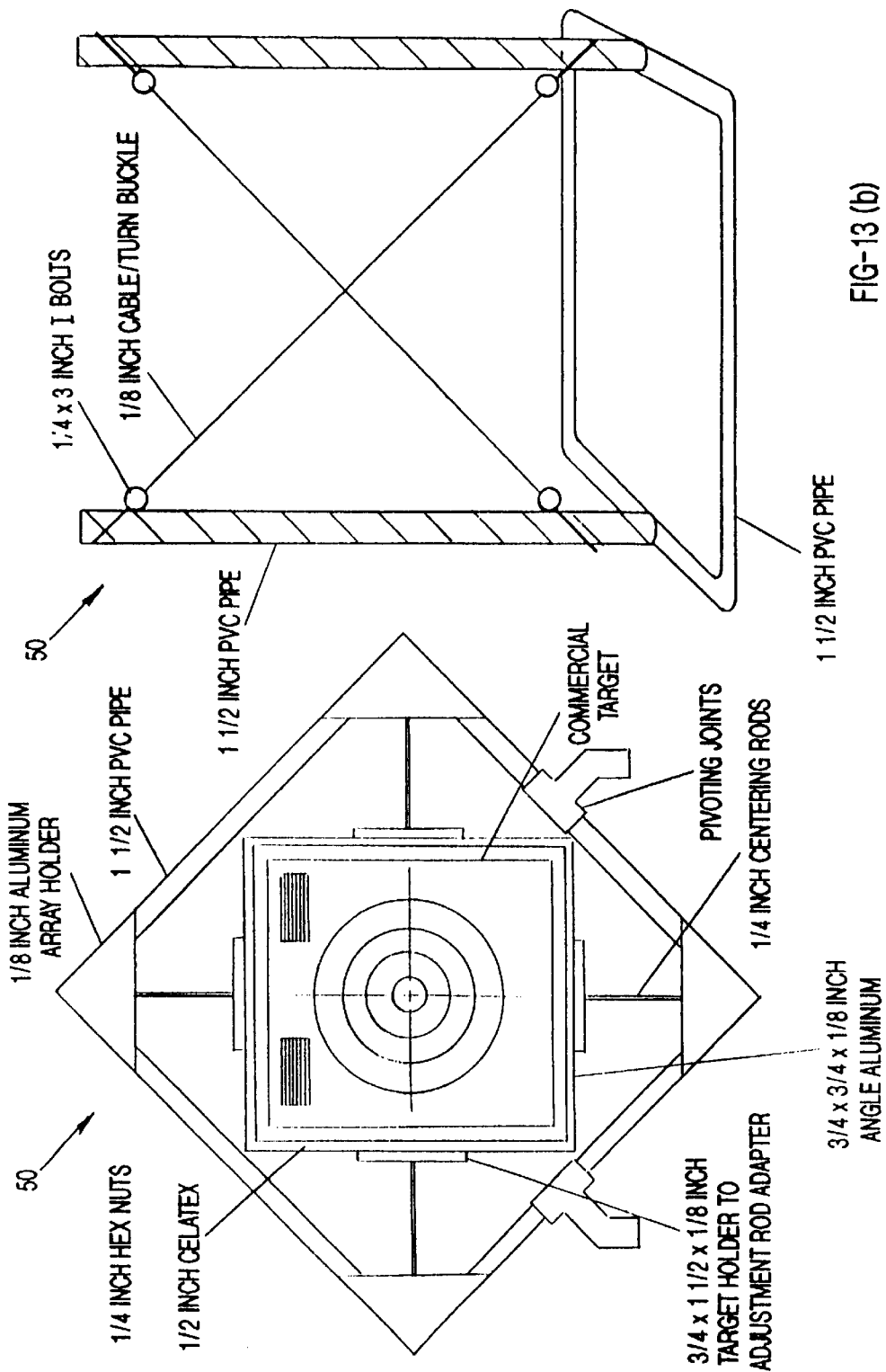

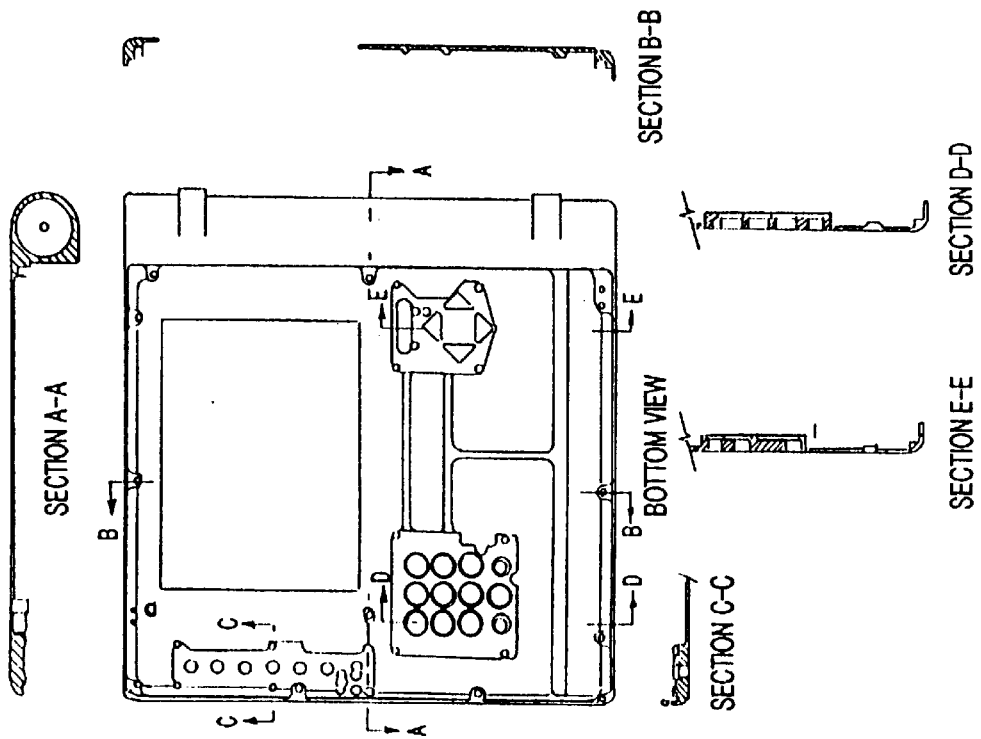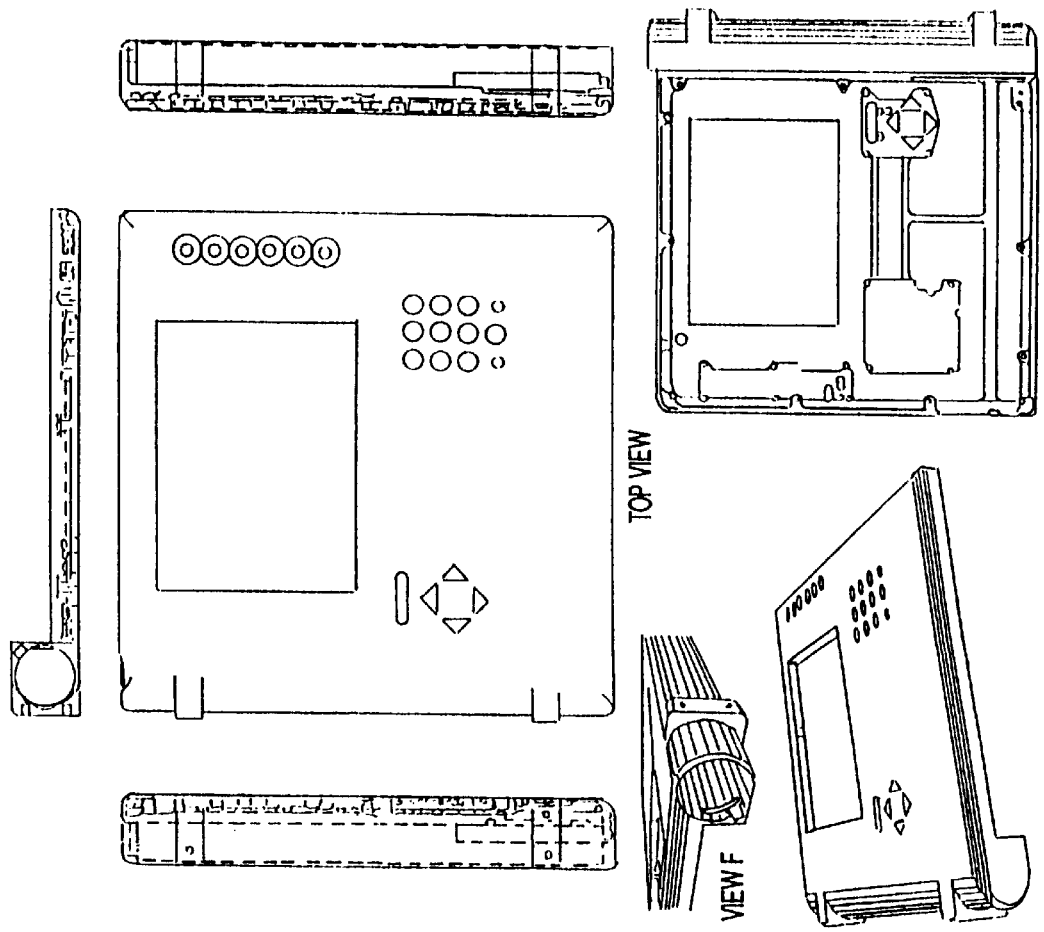
FIG-15(a)

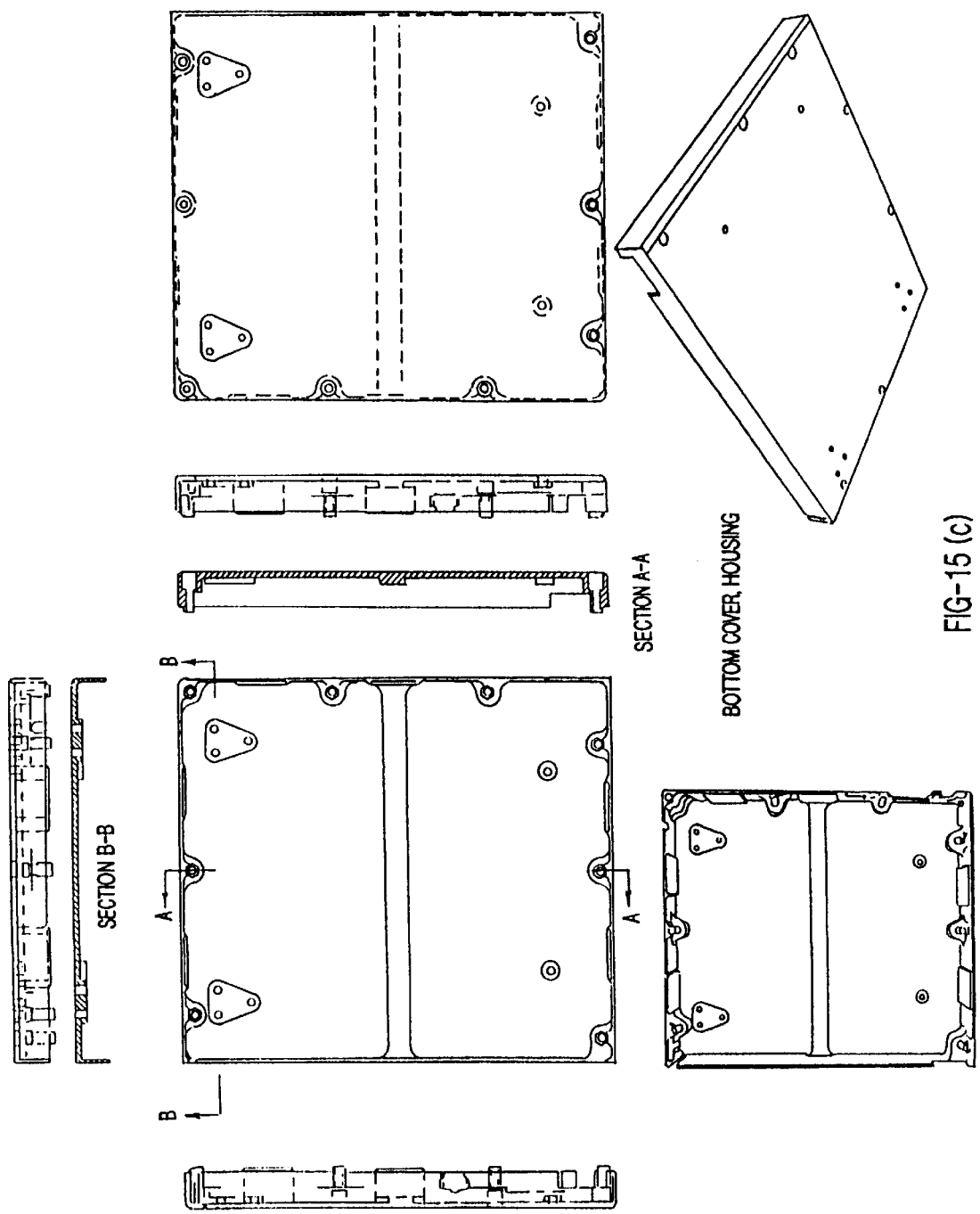

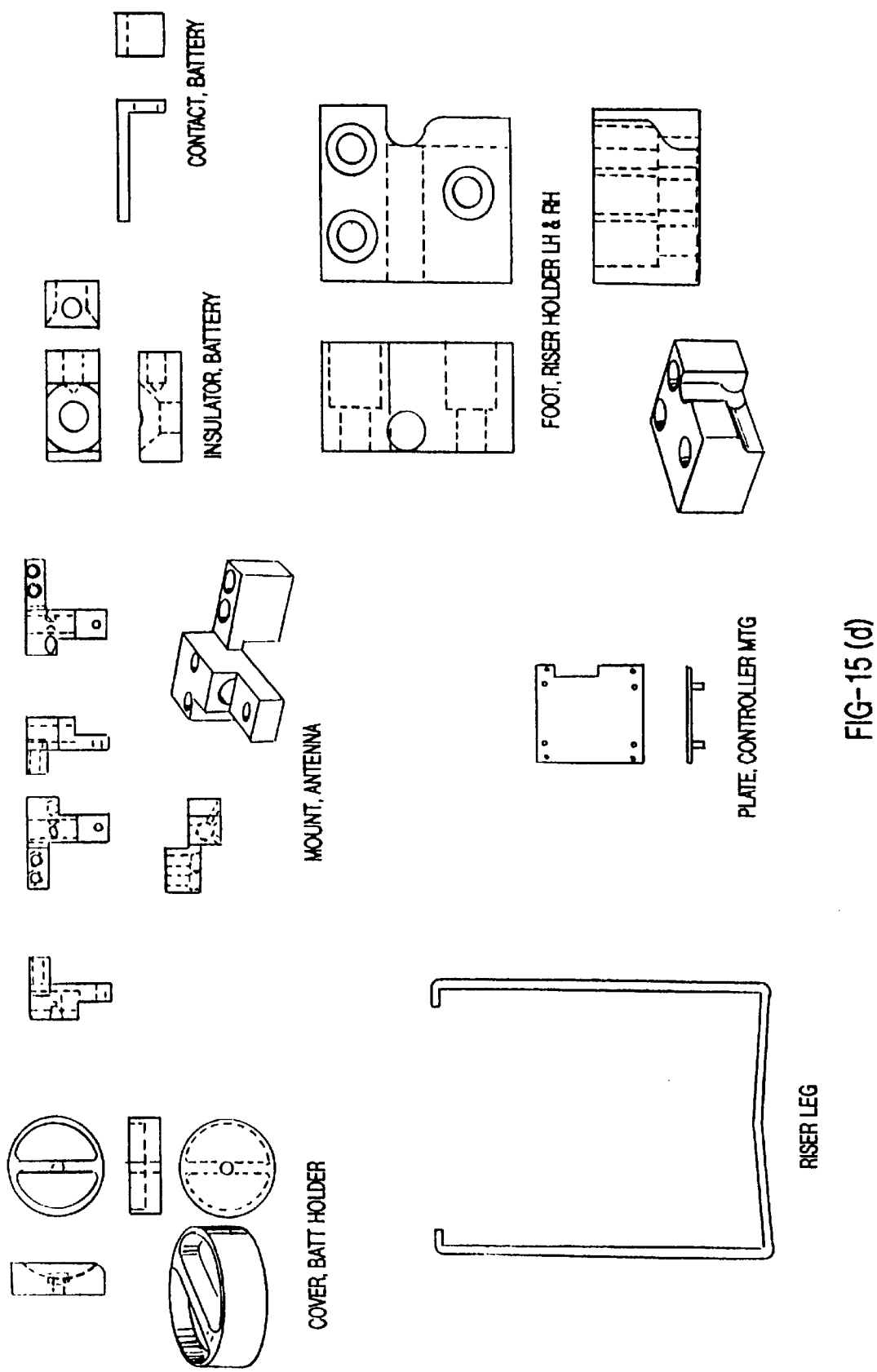

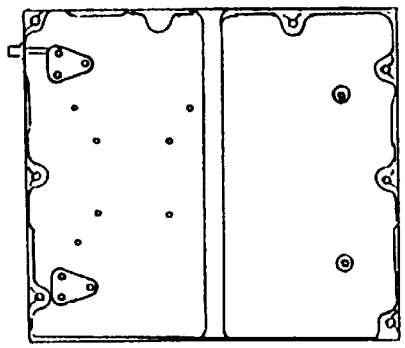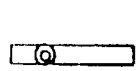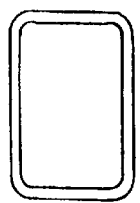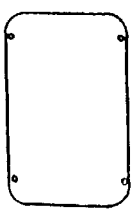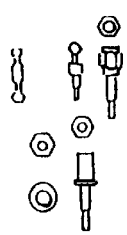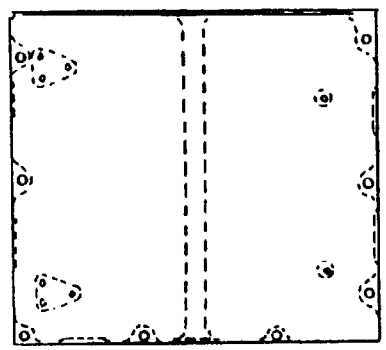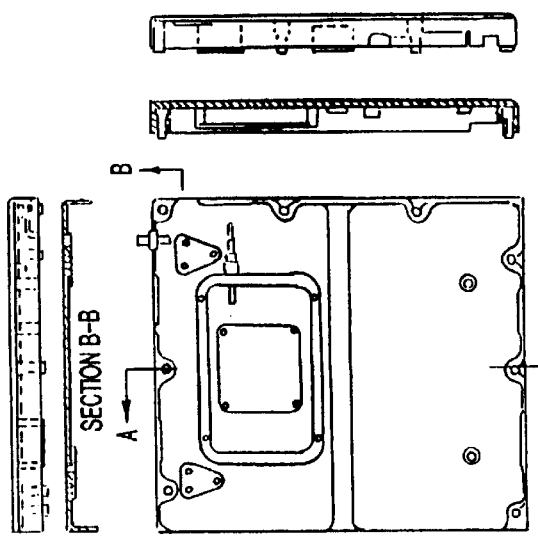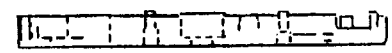
FIG-15 (e)

SHEET 2

SHEET 1

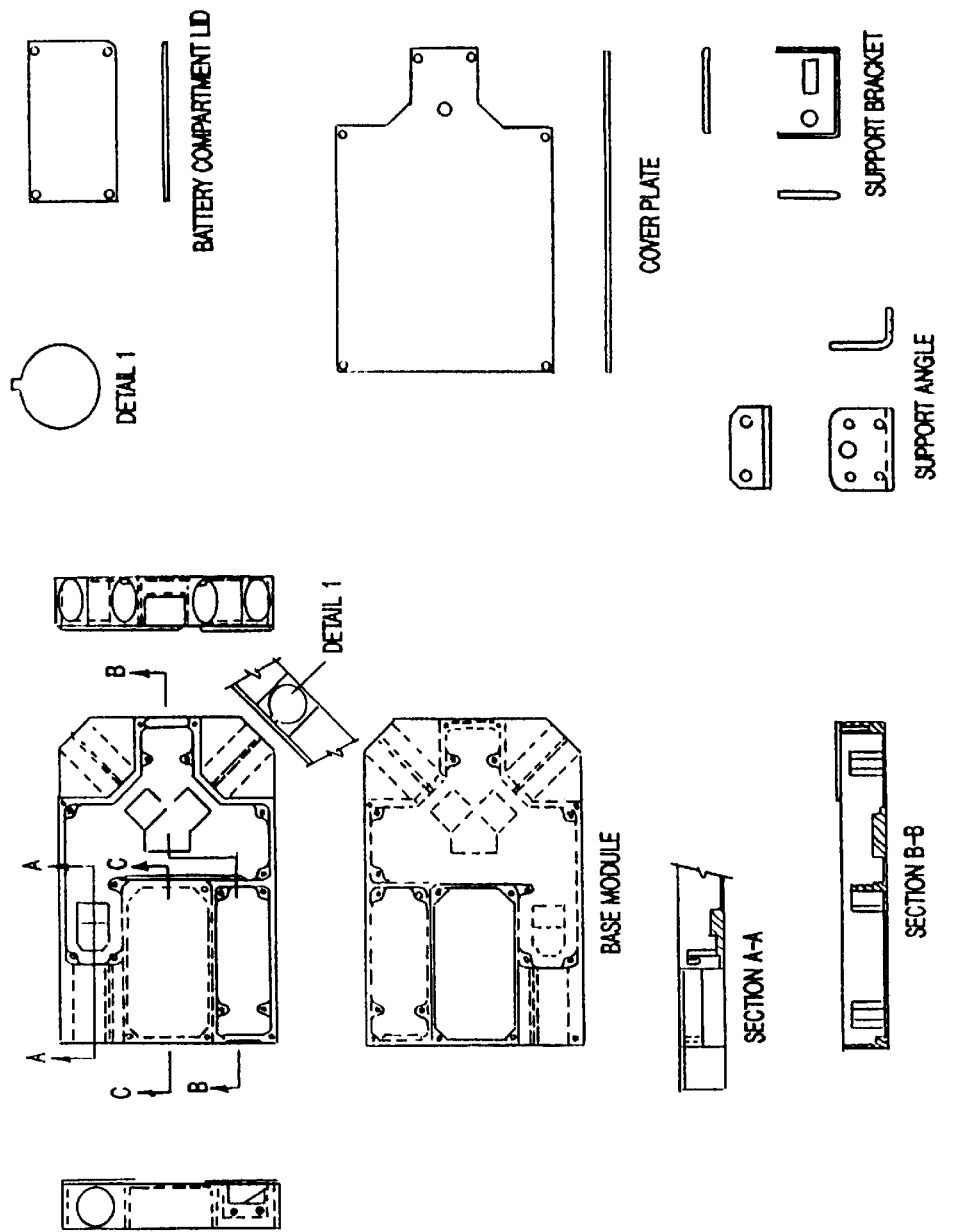

SHEET 1

SHEET 2

11.680372 CAL MAPPING: (x,y)_RESOLUTION_TEST

DATA FILENAME = TARGET 0 DAT
NON-LINEAR MODE.
ROI BOUNDED DATA SET.
ROI RADIAL BOUNDARY = 12.00 INCHES
NO. DATA POINTS = 21

• = MEASURED TARGET DATA
○ = ARRAY CALIBRATED DATA

-12.272753
-11.792277    RMS STD = 0.038511"    12.160848

TARGET 0. DAT

| ARRAY X | ARRAY Y | ARRAY V | X | Y | V |
|---|---|---|---|---|---|
| 38 | 778 | 1457 | .17 | 1.62 | 2920 |
| 497 | 420 | 1460 | 1.44 | .70 | 2914 |
| -498 | -803 | 1470 | -1.19 | -2.58 | 2894 |
| -1076 | 92 | 1439 | -2.78 | -.21 | 2957 |
| -145 | 1390 | 1442 | -.4 | 3.20 | 2950 |
| 916 | 168 | 1411 | 2.43 | 0.0 | 3015 |
| -37 | -1211 | 1442 | -.08 | -3.66 | 2950 |
| -1587 | -86 | 1439 | -4.16 | -.66 | 2957 |
| -345 | 1760 | 1420 | -.90 | 4.31 | 2996 |
| 1113 | -166 | 1437 | 2.95 | -.82 | 2961 |
| 32 | 1347 | 1427 | .13 | -4.0 | 2982 |
| -2107 | -79 | 1419 | -5.59 | -.71 | 2998 |
| -226 | 2321 | 1420 | -.65 | 5.75 | 2996 |
| 2142 | 187 | 1417 | 5.75 | .09 | 3003 |
| -82 | 1738 | 1416 | -.17 | -5.06 | 3005 |
| -101 | 2952 | 1391 | -.27 | 7.48 | 3059 |
| 2193 | 440 | 1430 | 5.90 | .84 | 2975 |
| -187 | -2076 | 1425 | -.39 | -5.91 | 2986 |
| 465 | -2798 | 1438 | 1.51 | -7.85 | 2959 |
| -114 | 629 | 1401 | -.30 | 1.29 | 3037 |
| 181 | 152 | 1403 | .47 | -.04 | 3033 |

10.680530 CAL MAPPING: (X,Y)_RESOLUTION_TEST

DATA FILENAME = TARGET 1.DAT
NON-LINEAR MODE
ROI BOUNDED DATA SET
ROI RADIAL BOUNDARY = 12.00 INCHES
NO. DATA POINTS = 23

• = MEASURED TARGET DATA
O = ARRAY CALIBRATED DATA

-10.710095
-11.008747    RMS STD = 0.037875"    10.381878

TARGET 1.DAT

| ARRAY X | ARRAY Y | ARRAY V | X | Y | V |
|---|---|---|---|---|---|
| -337.000 | 31.000 | 1384.000 | -0.970 | -0.380 | 3074.000 |
| -666.000 | 423.000 | 1409.000 | -1.880 | 0.710 | 3020.000 |
| -1101.000 | 697.000 | 1404.000 | -3.010 | 1.440 | 3030.000 |
| -997.000 | 1505.000 | 1416.000 | -2.740 | 3.620 | 3005.000 |
| -1961.000 | 1500.000 | 1406.000 | -5.360 | 3.720 | 3026.000 |
| -2332.999 | 2351.000 | 1394.000 | -6.600 | 6.180 | 3052.000 |
| 167.000 | -209.000 | 1374.000 | 0.430 | -1.020 | 3097.000 |
| 232.000 | -311.000 | 1400.000 | 0.591 | -1.270 | 3059.000 |
| 777.000 | -362.000 | 1402.000 | 2.060 | -1.420 | 3035.000 |
| 753.000 | -892.000 | 1395.000 | 1.980 | -2.790 | 3050.000 |
| 1331.000 | -1452.000 | 1405.000 | 3.610 | -4.360 | 3020.000 |
| 1649.000 | -2453.000 | 1410.000 | 4.670 | -7.170 | 3017.000 |
| -197.000 | 163.000 | 1382.000 | -0.510 | 0.000 | 3079.000 |
| 686.000 | 727.000 | 1381.000 | 1.850 | 1.480 | 3081.000 |
| 776.000 | 953.000 | 1379.000 | 2.100 | 2.100 | 3085.000 |
| 1209.000 | 1155.000 | 1400.000 | 3.250 | 2.670 | 3059.000 |
| 1408.000 | 1819.000 | 1388.000 | 3.810 | 4.490 | 3065.000 |
| 2091.000 | 2489.000 | 1401.000 | 5.820 | 6.520 | 3037.000 |
| -128.000 | 525.000 | 1395.000 | -0.380 | 1.010 | 3050.000 |
| -692.000 | -318.000 | 1421.000 | -1.860 | -1.270 | 2994.000 |
| -1360.000 | -1280.000 | 1404.000 | -3.710 | -3.930 | 3030.000 |
| -1607.000 | -1599.000 | 1415.000 | -4.400 | -4.820 | 3007.000 |
| -2162.000 | -1922.000 | 1390.000 | -5.960 | -5.850 | 3048.000 |

TARGET 2. DAT

| ARRAY X | ARRAY Y | ARRAY V | X | Y | V |
|---:|---:|---:|---:|---:|---:|
| -62.000 | -14.000 | 1401.000 | -0.164 | -0.450 | 3037.000 |
| -179.000 | 443.000 | 1404.000 | -0.489 | 0.770 | 3030.000 |
| -175.000 | 1749.000 | 1389.000 | -0.450 | 4.260 | 3063.000 |
| -513.000 | 2123.000 | 1378.000 | -1.388 | 5.280 | 3088.000 |
| -103.000 | 2585.000 | 1415.000 | -0.280 | 6.523 | 3007.000 |
| -133.000 | 372.000 | 1399.000 | -0.310 | 0.584 | 3041.000 |
| 167.000 | -259.000 | 1392.000 | 0.540 | -1.139 | 3056.000 |
| -80.000 | -1153.000 | 1431.000 | -0.099 | -3.489 | 2973.000 |
| -113.000 | -1543.000 | 1437.000 | -0.204 | -4.554 | 2961.000 |
| 45.000 | -2093.000 | 1369.000 | 0.200 | -6.000 | 3108.000 |
| -267.000 | -164.000 | 1397.000 | -0.622 | -0.853 | 3046.000 |
| 903.000 | 229.000 | 1389.000 | 2.471 | 0.140 | 3063.000 |
| 1654.000 | 180.000 | 1398.000 | 4.480 | 0.076 | 3043.000 |
| 2247.000 | 653.000 | 1409.000 | 6.051 | 1.382 | 3020.000 |
| 2442.000 | 327.000 | 1400.000 | 6.510 | 0.473 | 3059.000 |
| 31.000 | 326.000 | 1424.000 | 0.102 | 0.439 | 2988.000 |
| -537.000 | 278.000 | -1421.000 | -1.394 | 0.330 | 2994.000 |
| -937.000 | 326.000 | 1403.000 | -2.620 | 0.416 | 3033.000 |
| -1388.000 | 248.000 | 1421.000 | -3.710 | 0.215 | 2994.000 |
| -2198.000 | -23.000 | 1421.000 | -5.750 | -0.445 | 2994.000 |

8.768319  CAL MAPPING: (X,Y)_RESOLUTION_TEST

DATA FILENAME = TARGET 3.DAT
NON-LINEAR MODE
ROI BOUNDED DATA SET
ROI RADIAL BOUNDARY = 12.00 INCHES
NO. DATA POINTS = 19

• = MEASURED TARGET DATA

○ = ARRAY CALIBRATED DATA

-9.591056
 -9.251266    RMS STD = 0.034760"    9:108109

TARGET 3. DAT

| ARRAY X | ARRAY Y | ARRAY V | X | Y | V |
|---|---|---|---|---|---|
| -693 | 108 | 1401 | -1.8 | -1.56 | 3037 |
| -1315 | 691 | 1405 | -3.50 | 1.44 | 3028 |
| -1490 | 1297 | 1415 | -4.04 | 3.07 | 3007 |
| -2191 | 1979 | 1400 | -6.01 | 5.06 | 3039 |
| 329 | 257 | 1414 | .93 | .23 | 3009 |
| 289 | -1107 | 1410 | .86 | -3.39 | 3017 |
| 1155 | -716 | 1429 | 3.14 | -2.38 | 2988 |
| 1078 | -1526 | 1404 | 3.01 | -4.55 | 3030 |
| 2007 | -1557 | 1417 | 5.55 | -4.79 | 3003 |
| -227 | 208 | 1396 | -.62 | .16 | 3048 |
| 778 | 673 | 1390 | 2.11 | 1.37 | 3016 |
| 1141 | 1127 | 1402 | 3.07 | 2.62 | 3035 |
| 1849 | 1690 | 1308 | 5.02 | 4.23 | 3065 |
| 2090 | 1782 | 1397 | 5.74 | 4.53 | 3946 |
| 42 | 166 | 1394 | .14 | .05 | 3052 |
| -881 | -770 | 1390 | -2.28 | -2.50 | 3061 |
| -1229 | -1251 | 1369 | -3.39 | -3.86 | 3108 |
| -1906 | -1098 | 1397 | -5.10 | -3.51 | 3059 |
| -1539 | -1829 | 1382 | -4.19 | -5.44 | 3079 |

9.516518 CAL MAPPING : (X,Y)_RESOLUTION_TEST

DATA FILENAME = TARGET4.DAT
NON-LINEAR MODE
ROI BOUNDED DATA SET
ROI RADIAL BOUNDARY = 12.00 INCHES
NO. DATA POINTS = 21

• MEASURED TARGET DATA

○ ARRAY CALIBRATED DATA

-10.202232
-9.797946   RMS STD = 0.041254"   9.920803

TARGET 4. DAT

| ARRAY Y | ARRAY X | ARRAY V | X | Y | V |
|---|---|---|---|---|---|
| 80 | 326 | 1421 | .28 | .43 | 2994 |
| -1675 | 1349 | 1387 | -4.5 | 3.25 | 3068 |
| 458 | 415 | 1396 | 1.30 | .66 | 3048 |
| -558 | 1350 | 1378 | -1.44 | 3.44 | 3088 |
| 141 | 2282 | 1372 | .37 | 5.72 | 3101 |
| 913 | 424 | 1373 | 2.56 | .69 | 3099 |
| 2026 | -221 | 1401 | 5.49 | -1.05 | 3037 |
| 283 | -433 | 1407 | .79 | -1.56 | 3024 |
| 610 | -1129 | 1389 | 1.75 | -3.47 | 3063 |
| 1292 | -1752 | 1399 | 3.59 | -5.17 | 3041 |
| -105 | -28 | 1377 | -.19 | -.50 | 3090 |
| 1221 | 1147 | 1374 | 3.44 | 2.65 | 3097 |
| 1862 | 1968 | 1368 | 5.20 | 5.02 | 3110 |
| -217 | 561 | 1409 | -.47 | 1.04 | 3020 |
| 28 | -1339 | 1378 | .12 | -4.0 | 3088 |
| 198 | -2473 | 1407 | .7 | -6.9 | 3024 |
| -1284 | -650 | 1399 | -3.37 | -2.22 | 3041 |
| -1065 | -1578 | 1377 | -2.83 | -4.71 | 3090 |
| -807 | 155 | 1398 | -2.09 | 0 | 3043 |
| -1707 | -64 | 1393 | -4.48 | -.66 | 3054 |
| -1893 | 202 | 1395 | -4.93 | .15 | 3050 |

| ARRAY X | ARRAY Y | ARRAY V | X | Y | V |
|---|---|---|---|---|---|
| -1299 | 301 | 1430 | -3.46 | .38 | 2975 |
| -1690 | 1401 | 1419 | -4.64 | 3.43 | 2998 |
| -1110 | 2597 | 1381 | -3.15 | 6.63 | 3081 |
| 77 | 2851 | 1388 | .23 | 7.23 | 3065 |
| 332 | 2185 | 1400 | 1.02 | 5.46 | 3039 |
| 1259 | 2011 | 1390 | 3.61 | 5.08 | 3061 |
| 2384 | 1429 | 1415 | 6.60 | 3.62 | 3007 |
| 1836 | -241 | 1415 | 4.94 | -1.07 | 3007 |
| 1689 | -1543 | 1410 | 4.78 | -4.72 | 3017 |
| 699 | -1790 | 1407 | 2.10 | -5.25 | 3024 |
| -62 | -2603 | 1410 | 0 | -7.49 | 3017 |

| TARGET 7.DAT | | | | | |
|---|---|---|---|---|---|
| ARRAY X | ARRAY Y | ARRAY V | X | Y | V |
| -2265.000 | 2237.000 | 1347.000 | -5.680 | 5.670 | 3159.000 |
| -1471.000 | 2367.000 | 1348.000 | -3.560 | 5.950 | 3156.000 |
| -2293.000 | 2786.000 | 1338.000 | -6.040 | 7.310 | 3160.000 |
| -838.000 | 2932.000 | 1323.000 | -1.870 | 7.390 | 3216.000 |
| -36.000 | 2653.000 | 1350.000 | 0.490 | 6.690 | 3152.000 |
| -109.000 | 2042.000 | 1327.000 | 0.280 | 4.960 | 3208.000 |
| 953.000 | 2796.000 | 1360.000 | 3.300 | 7.140 | 3128.000 |
| 1786.000 | 2872.000 | 1373.000 | 5.710 | 7.620 | 3099.000 |
| 1953.000 | 2203.000 | 1354.000 | 6.070 | 5.730 | 3142.000 |
| 2063.000 | 1397.000 | 1378.000 | 6.330 | 3.460 | 3068.000 |
| 1852.000 | 649.000 | 1362.000 | 5.660 | 1.340 | 3124.000 |
| 185.000 | 649.000 | 1362.000 | 5.660 | 1.340 | 3124.000 |
| 1545.000 | -1533.000 | 1427.000 | 5.120 | -4.780 | 2962.000 |
| 2085.000 | -960.000 | 1378.000 | 6.360 | -3.210 | 3088.000 |
| 2152.000 | -2098.000 | 1381.000 | 6.840 | -6.380 | 3081.000 |
| 1337.000 | -2231.000 | 1381.000 | 4.560 | -6.630 | 3081.000 |
| 283.000 | -2388.000 | 1362.000 | 1.570 | -6.960 | 3124.000 |
| -1489.000 | -2675.000 | 1350.000 | -3.590 | -7.930 | 3152.000 |
| -1489.000 | -2675.000 | 1350.000 | -3.590 | -7.930 | 3152.000 |
| -2258.000 | -1595.000 | 1395.000 | -5.640 | -5.130 | 3050.000 |
| -2189.000 | -435.000 | 1375.000 | -5.320 | -1.860 | 3094.000 |
| -1926.000 | 695.000 | 1370.000 | -4.700 | 1.360 | 3106.000 |
| -1569.000 | 1925.000 | 1353.000 | -3.920 | 4.760 | 3145.000 |
| -1275.000 | 1936.000 | 1344.000 | -3.000 | 4.720 | 3166.000 |
| -1993.000 | 1873.000 | 1351.000 | -4.940 | 4.670 | 3149.000 |
| -2138.000 | 1336.000 | 1367.000 | -5.110 | 3.150 | 3112.000 |
| 1101.000 | 1660.000 | 1376.000 | 3.660 | 4.680 | 3092.000 |
| -325.000 | 479.000 | 1380.000 | -0.280 | 0.820 | 3083.000 |
| -879.000 | 1294.000 | 1346.000 | -1.790 | 2.970 | 3161.000 |
| 894.000 | 964.000 | 1361.000 | 3.050 | 2.150 | 3126.000 |
| 454.000 | -554.000 | 1385.000 | 1.870 | -2.020 | 3072.000 |
| -353.000 | -1073.000 | 1374.000 | -0.380 | -3.420 | 3097.000 |
| -1179.000 | -1340.000 | 1357.000 | -2.470 | -4.220 | 3155.000 |
| 311.000 | -1397.000 | 1373.000 | 1.610 | -4.290 | 3099.000 |
| 1570.000 | -1099.000 | 1393.000 | 5.010 | -3.530 | 3054.000 |
| -1075.000 | -1437.000 | 1383.000 | -2.330 | -4.480 | 3076.000 |
| 293.000 | 809.000 | 1369.000 | 1.430 | 1.660 | 3108.000 |
| -1894.000 | -1904 | 1360 | -4.50 | -5.86 | 3128 |
| 1964.000 | 2566.000 | 1351.000 | 6.160 | 6.780 | 3149.000 |
| 233 | 669 | 1364 | 120 | 1.33 | 3119 |

REMOTE SENSING APPARATUS OF SUPERSONIC PROJECTILE

CROSS-REFERENCE TO RELATED APPLICATIONS

This application claims the benefit of the filing of Provisional Application Serial No. 60/022,553, entitled "Remote Target Display System", filed on Jul. 19, 1996, and the specification thereof is incorporated herein by reference.

BACKGROUND OF THE INVENTION

1. Field of the Invention (Technical Field)

The present invention is related generally to methods and apparatuses for measuring the position, velocity, energy and impact characteristics of a projectile traveling at supersonic speeds.

2. Background Art

Existing methods for the measurement of the velocity and intersection position of a shot on a target are based on pressure shockwave concepts. A supersonic projectile generates a conically shaped expanding shockwave called a Mach-cone where the local and temporal air turbulence effects can be characterized by a steep change in ambient air pressure (shock front) which expands radially outward from the projectile path. However, existing systems are based on directional triangulation techniques where an acoustical sensor array is used only to determine the acoustic energy emitted by a passing bullet and determines the directions from which this shock front arrives at the sensor microphones.

Primary examples of the current prior include U.S. Pat. No. 5,349,853 (Oehler) and U.S. Pat. No. 5,025,424 (Rohrbaugh). Both employ the acoustical energy directional technique, but address the issue of accuracy with two divergent approaches. Oehler uses a complete ballistic history computation procedure to improve measurement resolution and Rohrbaugh uses a sensor design to meet the same goal.

Oehler's invention is designed to observe the complete ballistic history of a projectile with acoustical shock wave mapping being only one component. Oehler does employ acoustical sensors, but uses a data-acquisition design, measurement and positional computational scheme based on full ballistic profiling. Oehler employs the integration of three separate measurements to predict the projectile impact point. These are (1) a firearm-pressure-strain measurement of bullet explosive characteristics and drive-force pressure, (2) a series of bullet trajectory (muzzle) detector measurements to determine initial projectile path and velocity parameters, and (3) three-point acoustical sensory array measurements to determine time-of-arrival and relative spacial displacement. This information is then integrated by an external personal computer program to compute the full trajectory profile of the bullet from the muzzle to the target. Oehler thus requires multiple measurement procedures and instrumentation for bullet placement determination, velocity, trajectory and relative time measurements. At the target plane, Oehler uses three acoustical sensors in a triangular format, for common time-zero reference determination relative to the time the bullet left the muzzle and nominal spacial positioning for the overall ballistic computation and "hit" location prediction. The three-point system restricts the relative target-area operational field-of-activity. The communication link from the acoustical array is land-line based. This limits functionality, range, and use. Oehler cannot perform any form of self analysis and diagnostic checks. In summary, Oehler is a full-profile ballistic measurement system designed to determine the characteristics of the bullet trajectory from the muzzle to the target. As such it is not designed to be portable or for general use by the public.

U.S. Pat. No. 5,025,424 (Rohrbaugh) discloses an automatic shock wave scoring apparatus for scoring a "hit" of a supersonic projectile. The Rohrbaugh invention is a single-site, fixed-location, automatic gunnery targeting system which uses the shock profile of a passing projectile to determine the placement of the projectile impact point above the sensor field. It employs several curved acoustic sensor rods which are positioned below the target-active area. These curved sensor rods are surface pressure-sensitive (to the acoustical shock wave) such that a secondary transverse shock wave is generated in each sensor by the incident shock cone. These secondary waves then propagate through each sensor to the transducers located at their ends. The relative time difference between the arrival of the secondary shock at each end is then used to determine the point of incidence of the projectile shock point on the outside of each sensor. Each curved sensor effectively emulates a two-dimensional array of discrete sensors with first incidence discrimination. In effect, they act like fan detectors to the passing projectile. Based on the geometry of these fan detectors, curvilinear remappings are projected and the relative position of the incident projectile is computed. In general, Rohrbaugh is designed for target projectile mapping. The basis of Rohrbaugh's invention is the unique form, composition, and action of the discrete fan detectors. Rohrbaugh employs two curved (polar) two-dimensional sensors that sense the profile of the shock in a curvilinear polar space, with all of the sensors positioned below the target area. As such, targeting is based on a two-point detection scheme employing a vector-directional cross-correlation technique. The current invention employs four discrete sensors, each of which samples a single point on the surface of the shock cone, within an orthogonal Cartesian coordinate system to ensure independence and separability in its sensor measurements. The Rohrbaugh unit requires resolution of a 2-dimensional cross-dependent projection remapping to determine positioning. The current invention employs simple orthogonal coordinate transform equations.

Other patents which relate to targeting include U.S. Pat. No. 5,247,488 (Borberg et al.), U.S. Pat. No. 4,885,725 (McCarthy et al.), U.S. Pat. No. 2,925,582 (Mattei et al.), U.S. Pat. No. 4,514,621 and 4,282,453 (Knight et al) and U.S. Pat. No. 4,261,579 (Bowyer et al.).

SUMMARY OF THE INVENTION
(DISCLOSURE OF THE INVENTION)

The present invention is of a remote targeting apparatus and method comprising: surrounding a projectile target with a sensor array, the sensor array comprising at least two pairs of acoustical sensors; computing projectile impact data; transmitting the data; receiving the data at a controller; and displaying information corresponding to the data. In the preferred embodiment, RF transmission/reception is performed, most preferably at a frequency of between approximately 902 and 928 MHz, with the controller having RF Faraday cage shielding and collision avoidance being employed to permit multiple sensor arrays to operate in a vicinity of one another. The controller preferably graphically simulates a target and projectile impact locations thereon, in real-time. Projectile impact locations within twelve inches of the center of the projectile target are calculated to an average RMS accuracy of less than approximately fifty thousandths of an inch, directly in an orthogonal Cartesian coordinate system. Velocity is also determined via an additional sensor at a predetermined distance from the sensor array which measures a difference in time between the projectile passing the additional sensor and the sensor array. Velocity dependent variations in projectile shock front characteristics are corrected for automatically, and correction of data display translation, rotation, and resolution differences with respect to the projectile target and the sensor array may be engaged. Preferably two pairs of acoustical transducers (most preferably acoustical microphones) are placed in a plane at cardinal compass points of the projectile target, with the additional acoustical transducer orthogonal to the two pairs. Projectile velocity is computed from data provided by the additional acoustical transducer and a paired acoustical transducer. Each of the transducers in the plane is located within an elbow of a housing, which housing has arms connecting the elbows, all of which are modular. An arm or a sensor may be incapacitated and the sensor array will continue to function. The sensor array executes self-diagnostic and self-wiring procedures.

The invention is also of a sensor apparatus and method for a projectile target, comprising calculating projectile impact locations within twelve inches of a center of the projectile target to an average RMS accuracy of less than approximately fifty thousandths of an inch. In the preferred embodiment, the sensor array comprises at least two acoustical sensors, and preferably at least two pairs of acoustical sensors, most preferably two pairs of acoustical transducers placed in a plane at cardinal compass points of the projectile target, with an additional acoustical transducer orthogonal to the two pairs. Projectile velocity is determined from data provided by the additional acoustical transducer and a paired acoustical transducer. Where two pairs of sensors are employed, the are preferably located within four elbows of a diamond-shaped housing. An arm or a sensor may be incapacitated and the sensor array will continue to function. The preferred sensors are off-the-shelf acoustical microphones. The array executes self-diagnostic and self-wiring procedures, calculates projectile impact locations in an orthogonal Cartesian coordinate system, and corrects for velocity dependent variations in projectile shock front characteristics.

The present invention was designed to overcome the inherent limitations in the prior art by employing a novel array measurement technique in combination with fast and reliable communications and data relay-display technology. As such, the apparatus and method defined in this invention have resulted in a compact, light-weight, portable remote targeting system that provides an integrated targeting system for real-time visual display, measurement, and analysis in a long-range target shooting environment. The present invention: (1) provides a high-performance, low-cost measurement device for the general consumer market, as well as military, industrial and law enforcement applications; (2) provides instant visual verification of shot placement and shot groups; (3) provides instantaneous measurement of a bullet's impact velocity; (4) provides computation of impact kinematics at the target, i.e., energy, power, energy dissipation, force per unit area and penetration estimates of the bullet at the target; (5) eliminates the need for a spotting scope and problems with scope-associated viewing alignment difficulties; (6) provides immediate integrated analysis of a target shooting session; (7) enables real-time accurate scoring and score updating; (8) eliminates the need to walk downrange to replace used targets; (9) provides computation and display of the mean group center; (10) provides shot-to-shot sighting adjustment information for windage and elevation; (11) eliminates ambiguity of bullet placement arising from bullets passing through holes in the target; (12) eliminates the need to replace targets or physically mark previous shot holes; (13) improves the cost of rifle/pistol sight/scope calibration by minimizing ammunition expenditures; (14) allows the shooter to compare bullet types, loads and weights as a function of accuracy in a real-time mode; (15) provides a high accuracy measurement device for quality control applications within the arms and ammunition manufacturing industries; (16) provides a real-time tool for law enforcement, military and public firearms training; and (17) provides a high-precision instrument for law enforcement and military studies into projectile penetration and damage studies.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIGS. 13(a) and (b) are front views of the two components of the stabilized, portable array stand of the invention.

Figure 1:
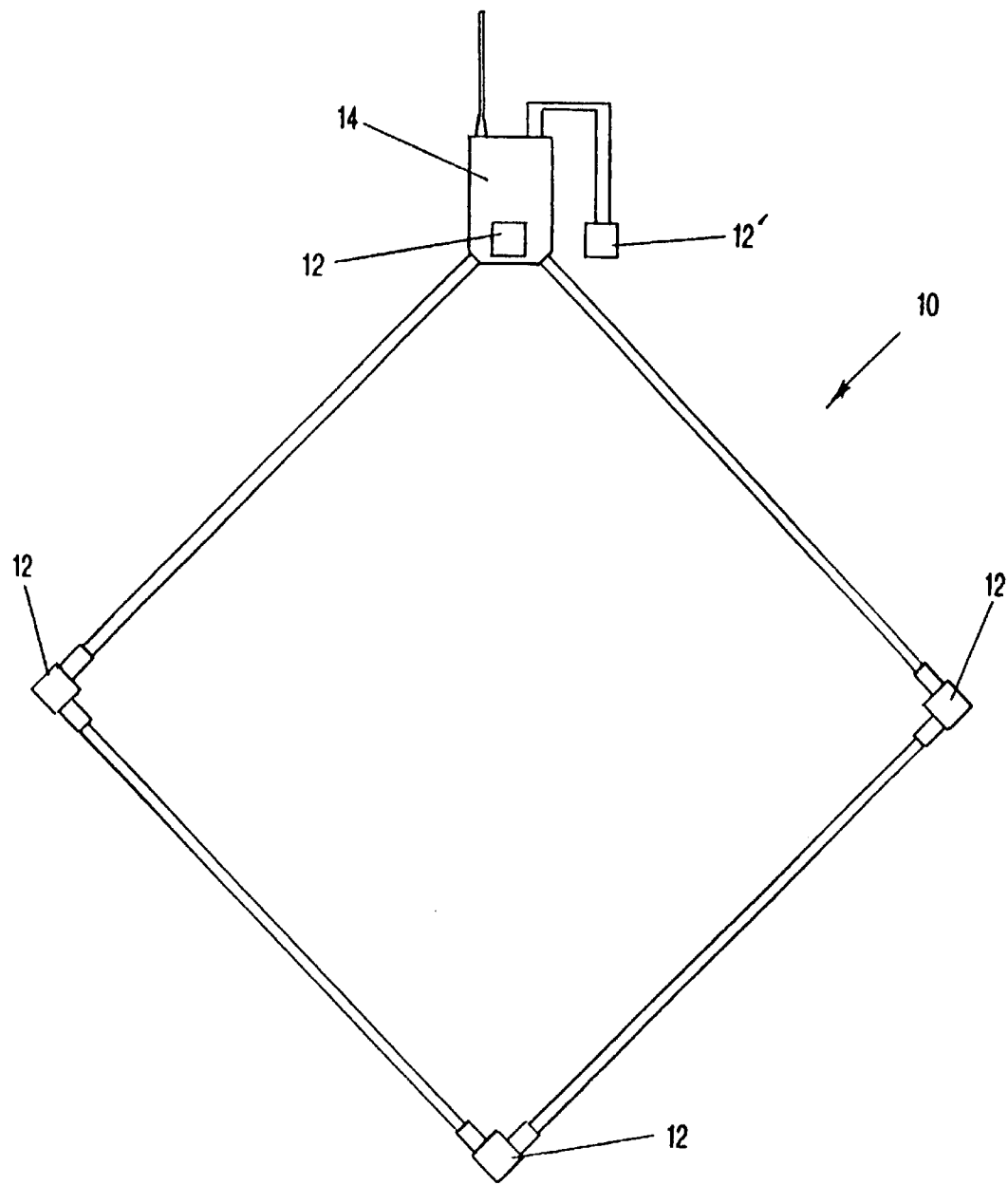
FIG. 1 is a schematic diagram of the sensor array of the invention.

DESCRIPTION OF THE PREFERRED EMBODIMENTS (BEST MODES FOR CARRYING OUT THE INVENTION)

The present invention is of a remote sensing apparatus and method for the measurement of the instantaneous velocity and sensor plane intersection Cartesian coordinates of a supersonic projectile within a targeting environment. The system records, displays and analyzes target shot patterns within a pistol or rifle range by remotely and unobtrusively detecting the positioning of an incident bullet, relays the targeting information from the target area back to the shooter into a portable control-display unit, and then analyzes the shot patterns in real-time.

Measurement is accomplished by examining the characteristics of the Mach-wave, an expanding conical pressure-wave shock front set up by the projectile as it passes through the air between matched pairs of acoustical transducers. Positional and velocity measurements are accomplished by determining the time-of-flight (arrival) differences in the Mach-cone between sensors. This time-based data is then directly correlated to spacial measurements for shot positioning and velocity determination.

As used herein, the term "acoustic energy" means either a pressure wave or shock wave generated by a supersonic projectile. The term "projectile or bullet" includes any recognized structure of the type capable of being launched or projected by a pistol or rifle firearm or any like device up to 0.50 caliber. As such, the words "bullet" and "projectile" will be used interchangeably throughout this disclosure. The term "controller" means a micro-processor based system employing digital memory and some form of input/output. The term "sensor array" means the sensor package for supersonic event detection, including the acoustic transducers, the array controller processing, and the RF transmitter. The following abbreviations are used: CDU—the base station hand-held control display unit used to analyze array targeting data; and RMS—root-mean-square.

The apparatus of the invention preferably comprises two units, a plug-together sensor array 10 (FIGS. 1–2 and 18–22) and a base station 50 (CDU; FIGS. 3–12 and 15–17) for display and analysis.

The sensor array preferably comprises three (although the pair measuring velocity may be eliminated, and more than three pairs may be employed if redundancy is desired) pairs of acoustical transducers 12 that detect the expanding compression wave of the projectile as it passes the array sensor imaging plane. In alternative embodiments, two or three sensors may also be utilized. An internal timing unit then computes the vertical and horizontal targeting placement components and the intersection plane velocity at the target. As the projectile's shock cone passes between the paired acoustical traducers, the relative time-of-arrival differentials in both the horizontal and vertical (sensor-plane) directions, for the radially expanding wave front, are measured. Orthogonally, a similar measurement is made as the projectile travels down line, with the time measurement being representative of the time-of-flight between two known spacial coordinates. The velocity is then computed as the ratio of the sensor pair displacement divided by the time. All placement timing and data acquisition occurs in the microprocessor at the target and is independent of the shooter's initial projectile characteristics.

The CDU contains an RF receiver 54 and a microprocessor 52 for shot pattern analysis and control of the LCD graphical/numerical display 56. This unit allows for the display of individual shot characteristics and group pattern measurements, with automatic scoring, elevation and windage adjustment computation, along with multiple target pattern selection and pan-zoom display features. It is preferably small, compact (e.g., 9"×9"×1.5" deep), light weight and operates on standard C-cell batteries. It preferably employs battery life extension electronics and apparatus diagnostic procedures. The invention also includes complete capability for multiple unit discrimination and multiple shooter false trigger discrimination. Multiple unit and multiple shooter discrimination is based on a simple bi-directional RF link keyed to a three-byte binary coded, system identification number. This allows for $2^{24}$ different unit identifiers between the array and the CDU. Since each data transmission sequence contains this identifier, each targeting unit is able to uniquely recognize its array/CDU counter part. If multiple arrays relay information simultaneously, i.e., generating an RF interference collision mode, each array continues to transmit data until it receives an acknowledgment of receipt from the CDU. Once the array-CDU handshaking is completed, both units enter an idle state until the next event occurs. If multiple array events occur before proper communication has been achieved, the array buffers the additional data (for up to 20 projectiles) and adds it to the data stream on the next data transmission attempt. This data is then relayed over an RF link 14 to the control-display base station (CDU) next to the shooter. For off-line interactive analysis of a shooting session, the invention includes a serial port 58 to access a personal computer based (e.g., Windows 95) application for targeting analysis, target file editing and handling data input/output.

Referring to the Tables and Figures, the present invention is a compact, light-weight, portable remote targeting system designed to be used to measure, record, display and perform real-time analysis of supersonic projectile patterns within a long-range targeting environment. A description of the apparatus features and specifications are given in Tables 1 and 2.

TABLE 1

APPARATUS FEATURES

| GENERAL | SENSOR ARRAY | CDU (control-display unit) |
|---|---|---|
| provides instantaneous visual display of bullet-target impact points | battery operated | battery operated |
| measures bullet velocity at the target | power management for extended battery life | contains its own microprocessor and memory for stand-alone, full-function operation |
| calculates the energy of a bullet at the target | easy snap together assembly and deployment | provides fast, near instantaneous visual display of a bullet's impact point on a target |
| provides real-time target scoring | all sensors and extension poles are interchangeable | provides numerical information about the bullet's target point and a group's mean coordinates |
| provides rifle-scope sight adjustment corrections | low cost replacement of sensors and poles | enables the storage of up to (>)10 different shot group sessions |
| enables real-time comparison and analysis of bullet weight/powder load-tests | contains automatic self-diagnostics for sensor failure detection | a shot group can have up to (>)150 individual shots or more |
| operates over long ranges greater then 0.25 miles. | contains a long range (keyed) data transmitter for ranges in excess of ¼ mile | individual shot groups can be stored and then recalled for display |
| employs a powerful radio link | contains an LED 'array-health indicator' to show when the unit is on and when it is operating properly | different shot groups can be graphically overlaid so visual and numeric comparisons of group accuracy can be made |
| contains a high-resolution graphical and numeric LCD display | contains its own internal microprocessor so it can tell when a shot hits within the target or outside | provides direct computation of rifle-scope windage and elevation corrections |
| its shape and form is ergonomically designed for ease of use with simple functionality | | automatically score target shooting sessions |
| provides for a PC interface for data IO | | provides for the internal display different target patterns |
| contains internal self-check diagnostics | | enables the downloading of a custom target pattern |
| employs advanced power management functions to optimize battery performance | | the display target field can be panned and zoomed to enhance viewing of target shot groups |
| light weight | | contains full power management capability for extended battery life |
| portable | | includes a low battery indicator |
| easily deployed (snap together components) and disassembled | | contains a backup system to save the memory when the unit is shut-down or when the batteries are replaced |
| low cost | | contains an optional AC adapter |
| | | has a serial output port for downloading stored shot data to a computer or uploading a new target pattern |
| | | contains a high-speed radio receiver link for long range operation (>¼ mile) |
| | | employs an automatic power shut-down |

Unlike all of the prior art, the invention preferably utilizes two pairs of orthogonally matched acoustical transducers for sensing the conical shock front of a projectile in order to differentiate projectile position to an average RMS positional accuracy of less than fifty thousands of an inch. The system is composed of two units, a fast plug-together sensor array, FIG. 1, and a custom designed base station called the 'control display unit', FIG. 3, for display and analysis. The specifications for the preferred apparatus is given in Table 2 for both the sensor array and the CDU.

TABLE 2

APPARATUS SPECIFICATIONS

| Characteristic | Specification |
|---|---|
| Sensor Array | |
| (Measurement) | |
| Measurement Sampling Interval | 2.765 mega-samples per second |
| Measurement Spacial Location Uncertainty | shot group average RMS deviation is less than 0.050" |
| Data Collection Rate | minimum of 10 shots per second |
| Data Buffering | up to 20 individual shot data sets |
| Data Transfer Rate | 4800 baud |
| (Transmitter Radio Link) | |
| Carrier Frequency | within the 902–928 MHZ band and optionally 418 MHZ band |
| Modulation Type | frequency shift keying (FSK) |
| Range | greater than ¼ mile (rural) |
| Output Power | 750 micro watts ERP (FCC Part 15) |
| Antenna | omni-directional 1.0 dBi |
| (Physical) | |
| Operating Temperature Range | 32° to 100° F. |
| Power | 2 "AA" batteries |
| Battery Life | 25–30 hours minimum |
| Size, sensor array area | 32" × 32" area = 1024 square inches |
| Weight | less than 15 oz. |
| Control/Display Unit (CDU) | |
| (Receiver Radio Link) | |
| Carrier Frequency | within the 902–928 MHZ band |
| Modulation Type | frequency shift keying (FSK) |
| Range | greater than ¼ mile (rural) |
| Receive Sensitivity | −80 dBM |
| Antenna | omni-directional 1.0 dBi |
| (Physical) | |
| Operating Temperature Range | 32° to 100° F. |
| Power | 4 "C-Cell" batteries |
| CDU Dimensions | 9.0" × 9.0" × 1.5" (LWH) |
| LCD Display Size | 3.0" × 4.0" (HW) @ 320 × 240 pixel array |
| Weight | 3.1 lbs. |
| (System) | |
| Operating System | Flash Ram/EPROM/ROM based |
| CPU | 25 MHz microprocessor |
| PC Interface | Serial Port at 9600 baud |
| PC Support Software | for Windows 3.1 and Windows 95 |

Figure 2:
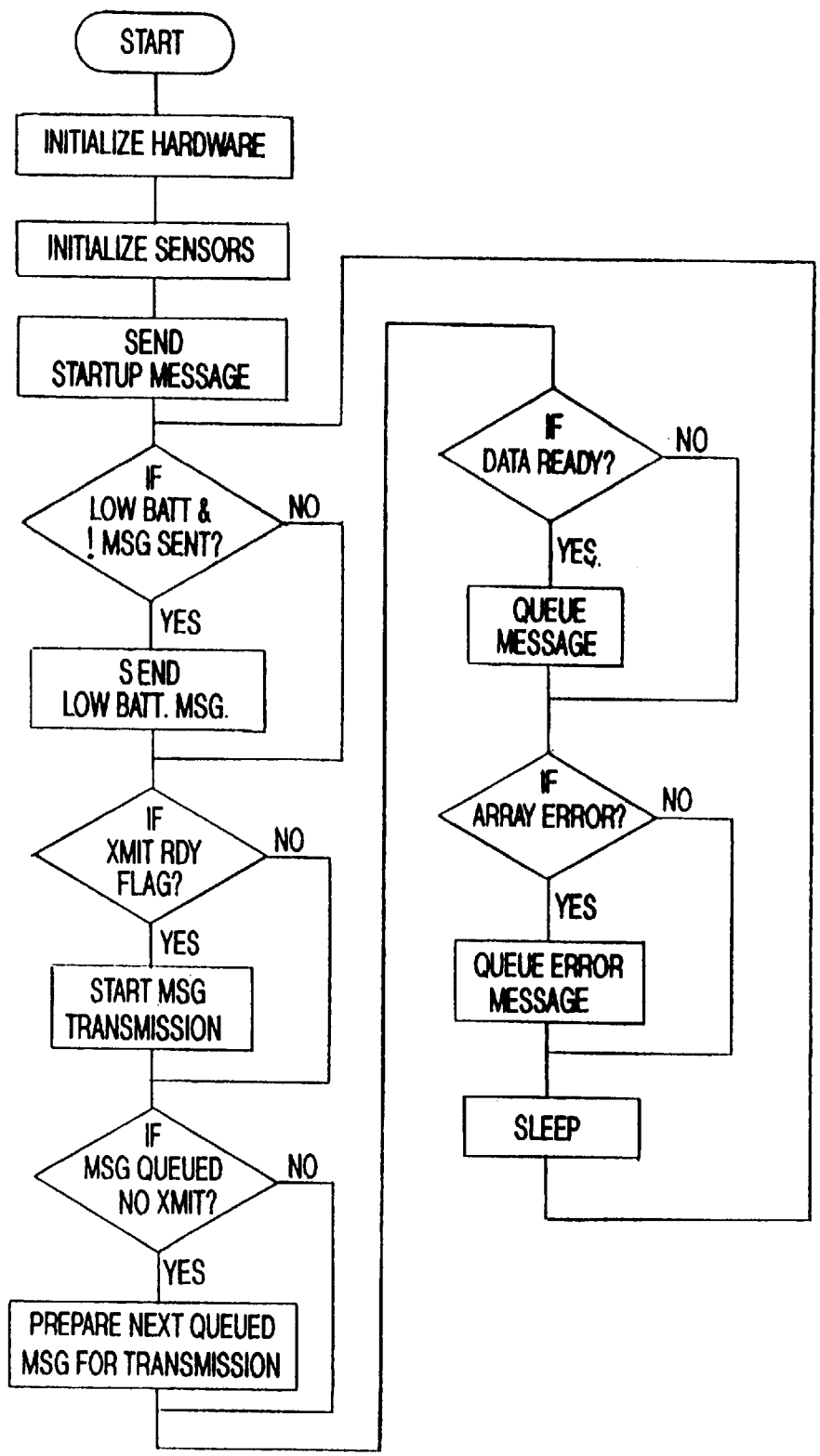
FIG. 2 is a flowchart for the operation of the sensor array.

The sensor array preferably comprises four paired microphones placed at the cardinal-compass points that detect the expanding compression wave of the projectile as it passes. A fifth sensor is paired orthogonally with one of the planar interaction sensors to provide for the time-of-flight measurement of a projectile as it passes through the sensor apparatus, over a path length of, preferably, eighteen inches. The preferred sensors may be standard off-the-shelf acoustical microphones. A process flow diagram for the array is shown in FIG. 2. Mechanical design, block layouts and electronic circuits are shown in FIGS. 18–22.

Comparator circuits coupled to a microprocessor compute the vertical and horizontal shock cone edge time-of-arrival differentials, using a preferred sampling rate at 360 nanoseconds or 2.765 mega samples per second and generate array relative placement parameters that are then relayed over a radio link to the CDU base station. The velocity of the projectile is handled in a similar manner. The radio link preferably operates in the 902–928 MHZ band, with a minimum data rate of 4800 to 9600 baud and an effective range of one-quarter mile. All placement timing and data acquisition takes place in the microprocessor at the target, and is independent of the shooter's initial projectile characteristics.

Figure 3:
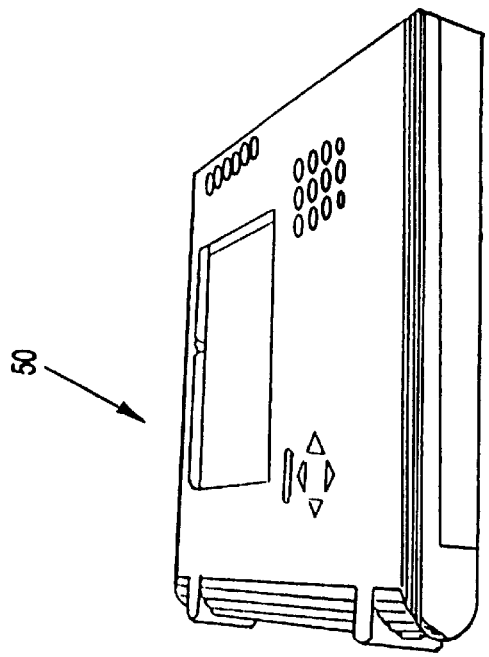
FIGS. 3(a) and (b) are front and front perspective views of the Control/Display Unit ("CDU") of the invention.
Figure 3:
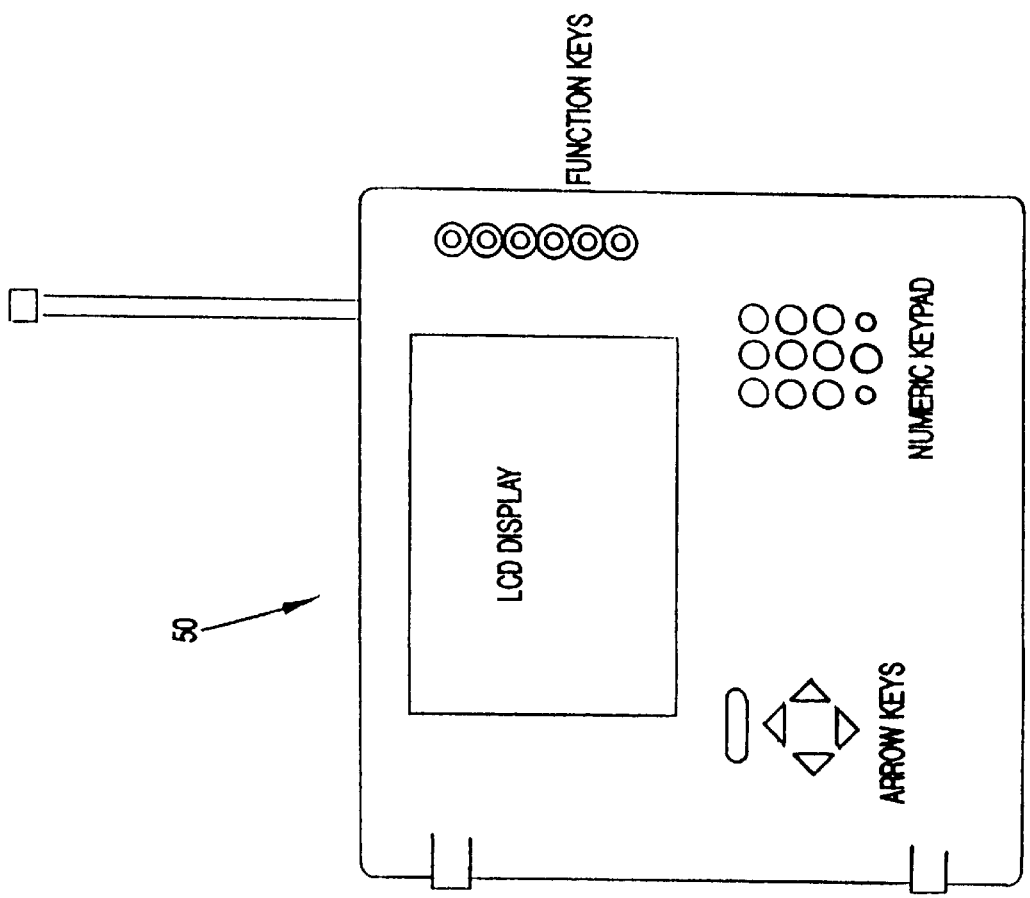
Figure 4:
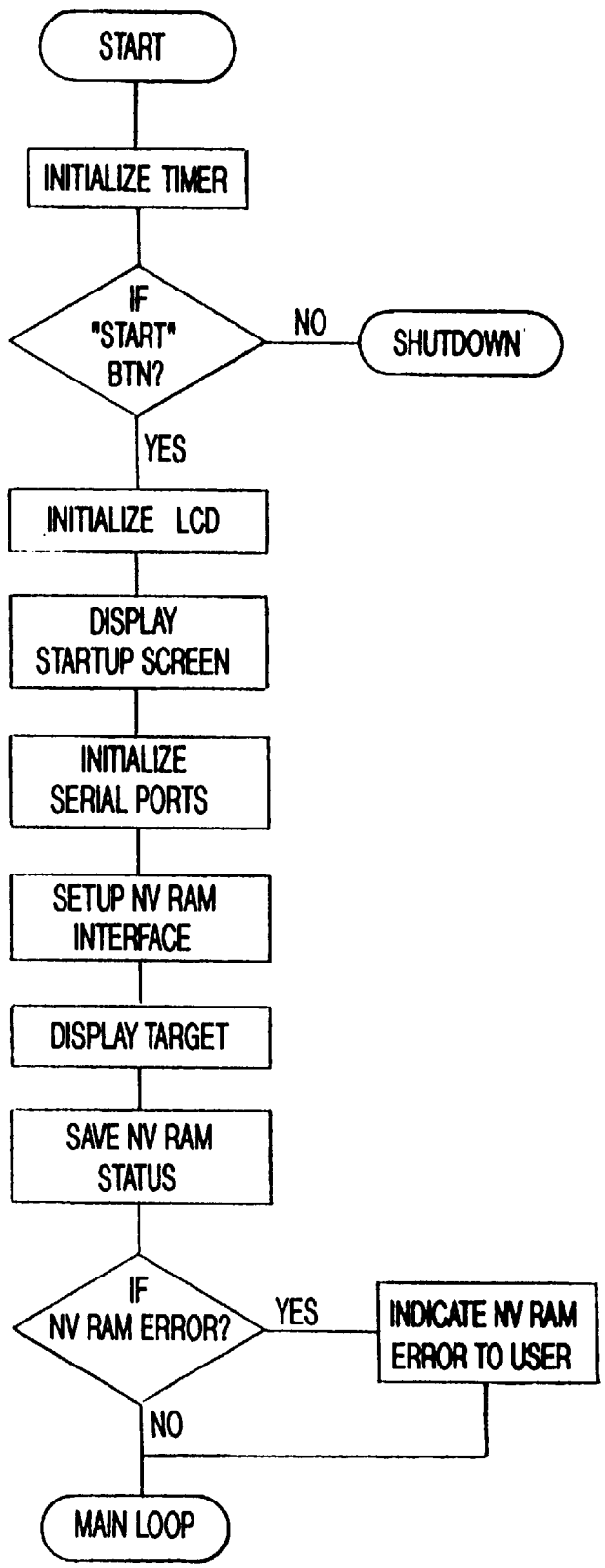
FIG. 4 is a flowchart of the CDU startup procedure.
Figure 5:
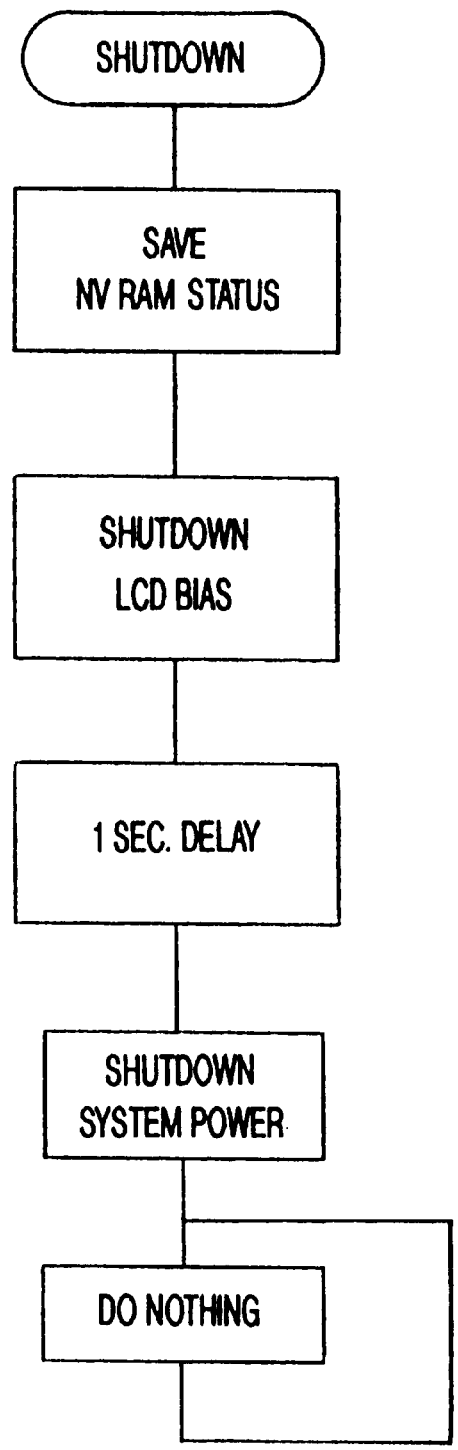
FIG. 5 is a flowchart of the CDU shutdown procedure.
Figure 6:
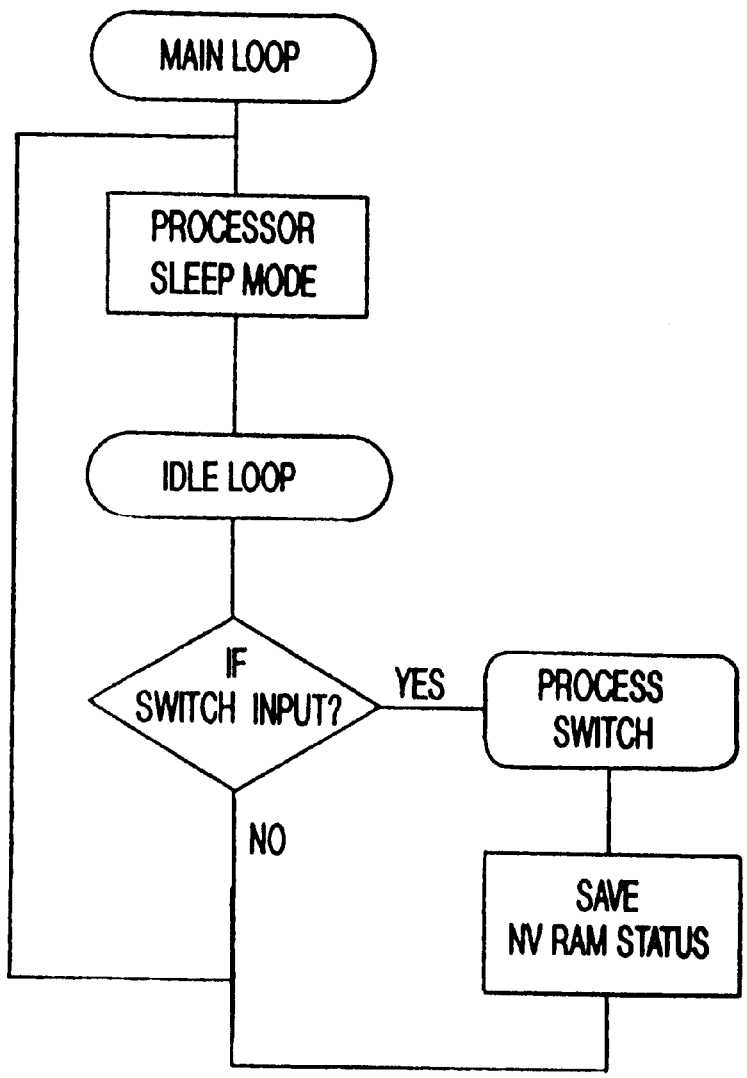
FIG. 6 is a flowchart of the main CDU operations loop.
Figure 7:
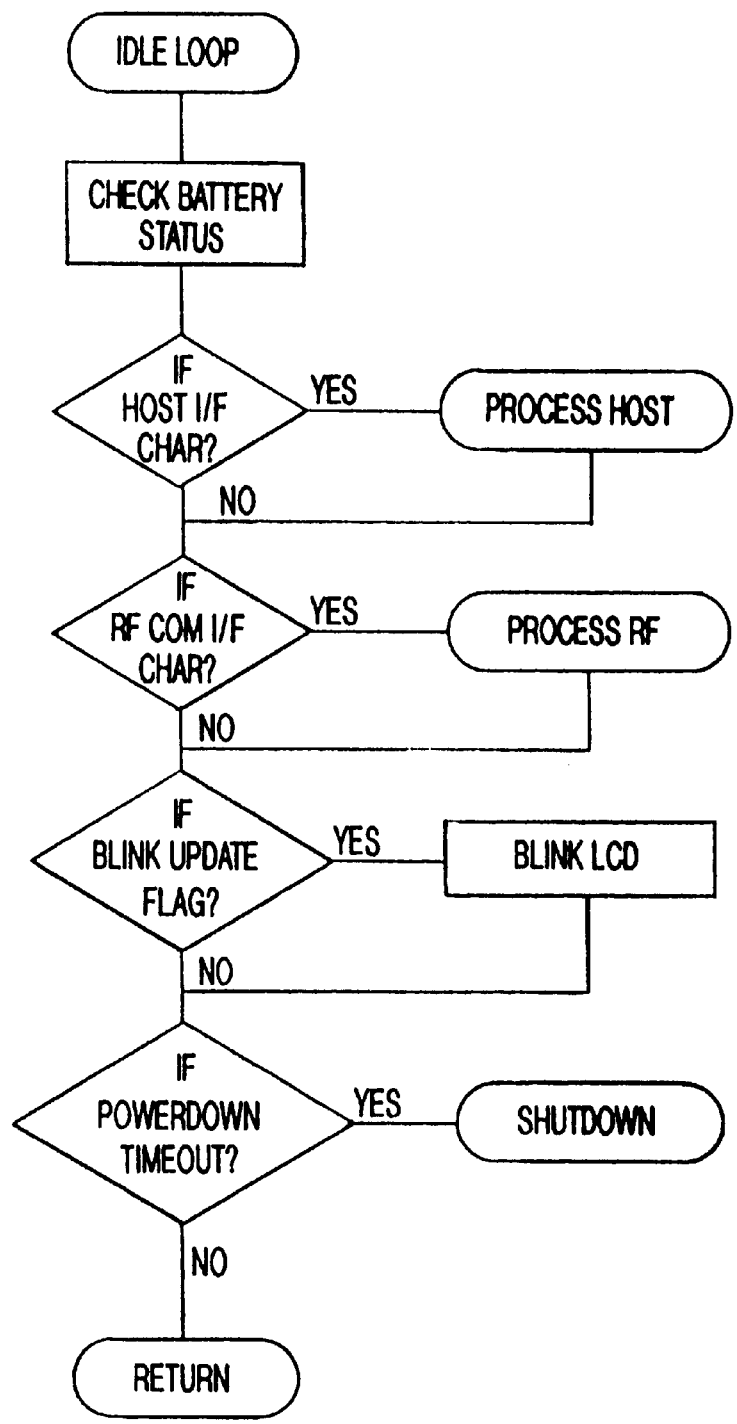
FIG. 7 is a flowchart of the CDU idle state process loop.
Figure 8:
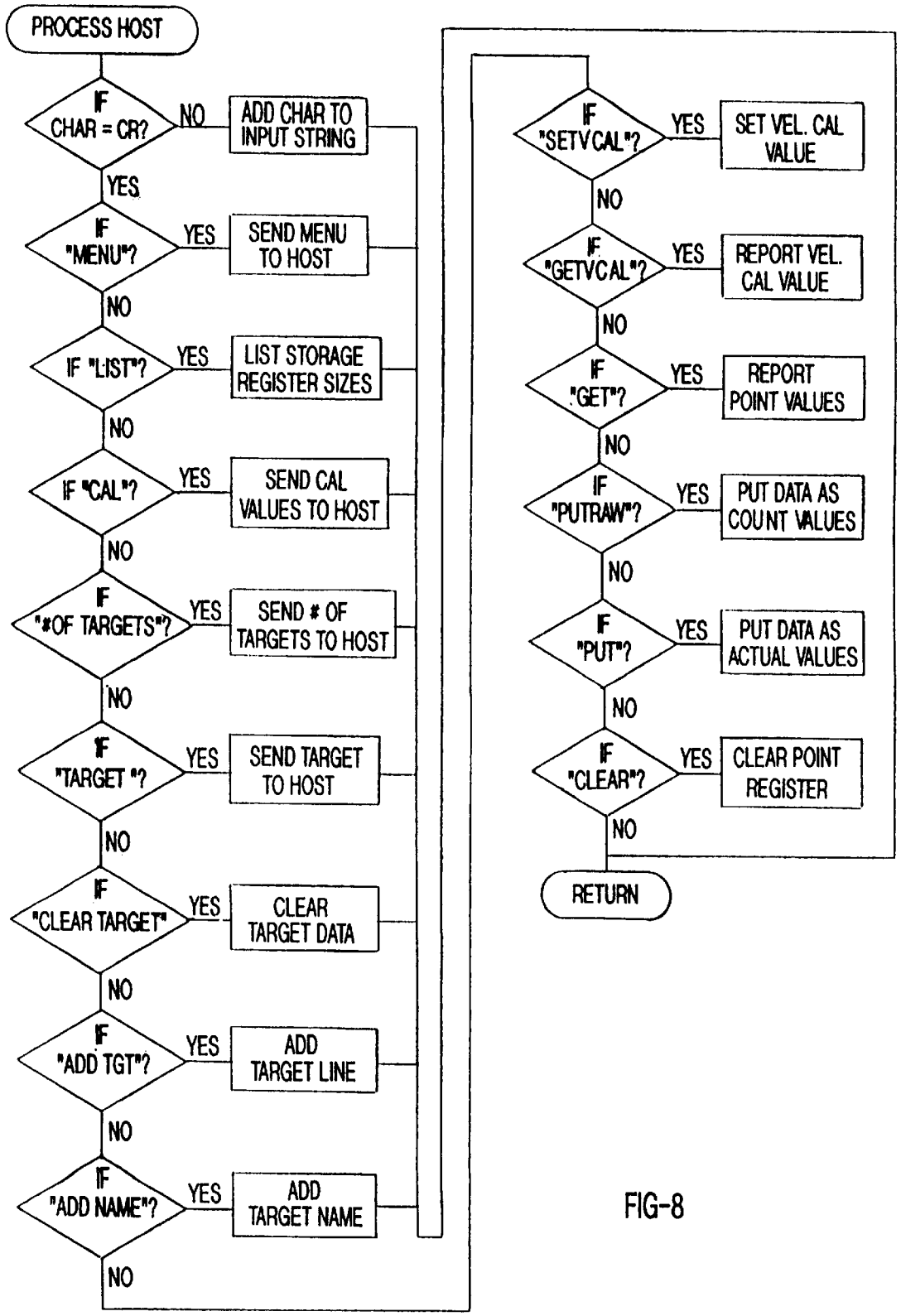
FIG. 8 is a flowchart of the procedure for host command execution on the CDU.
Figure 9:
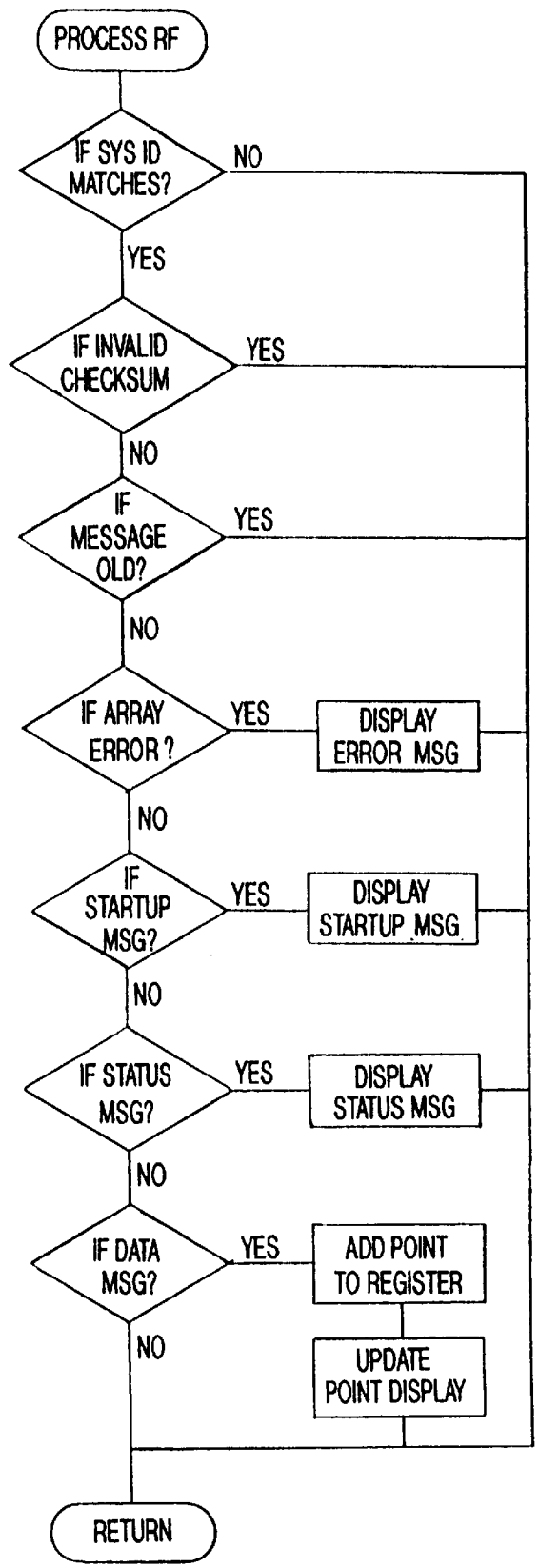
FIG. 9 is a flowchart of the procedure for array message process handling on the CDU.
Figure 10:
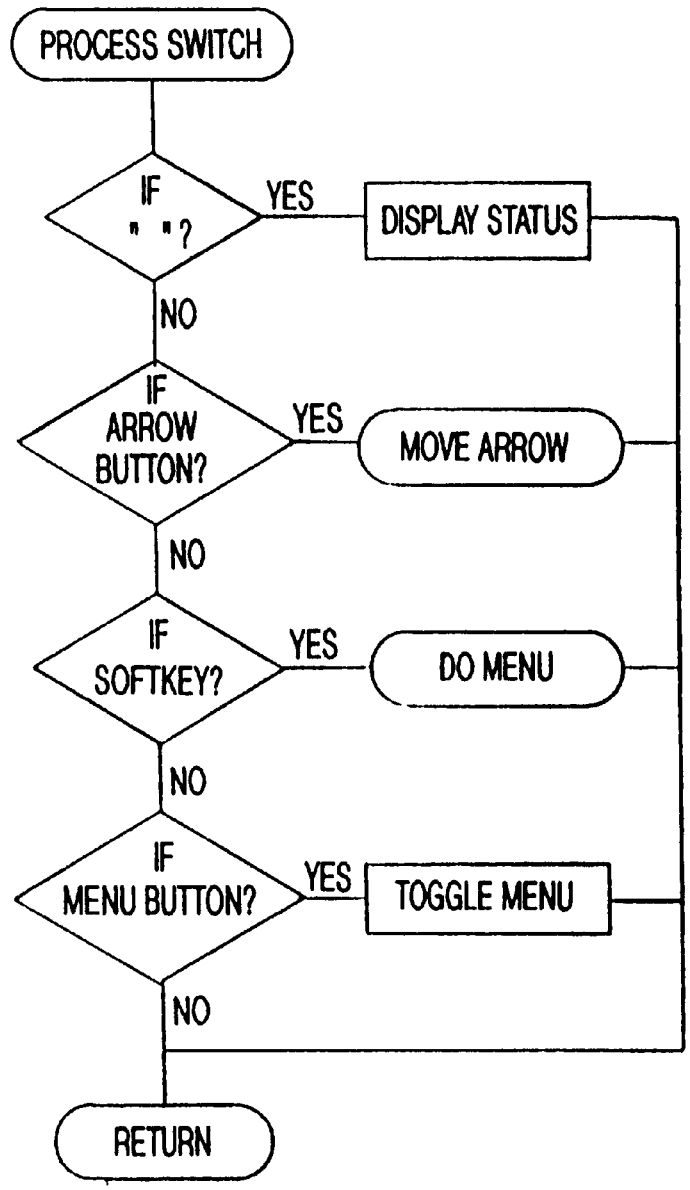
FIG. 10 is a flowchart of the CDU switch input process.
Figure 11:
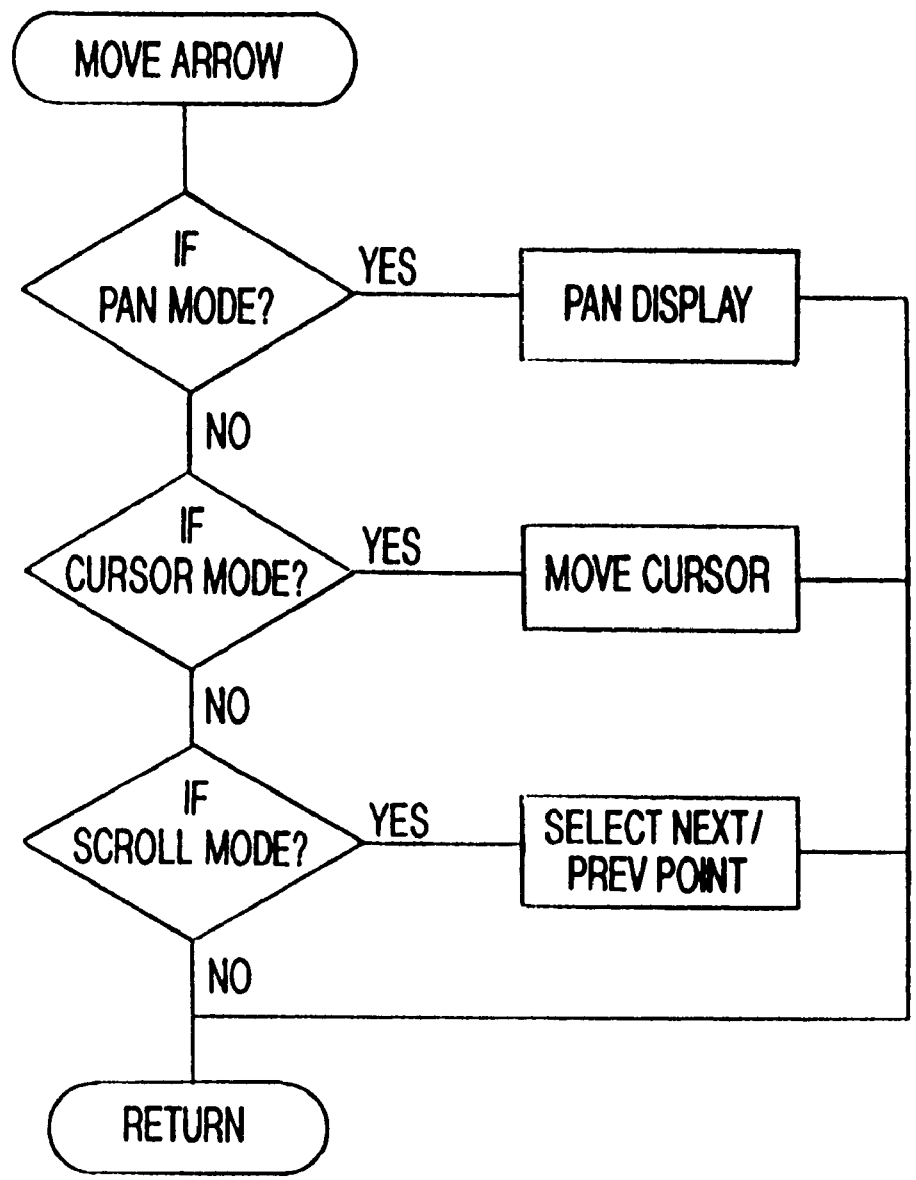
FIG. 11 is a flowchart of the CDU graphics screen arrow control process.
Figure 12A:
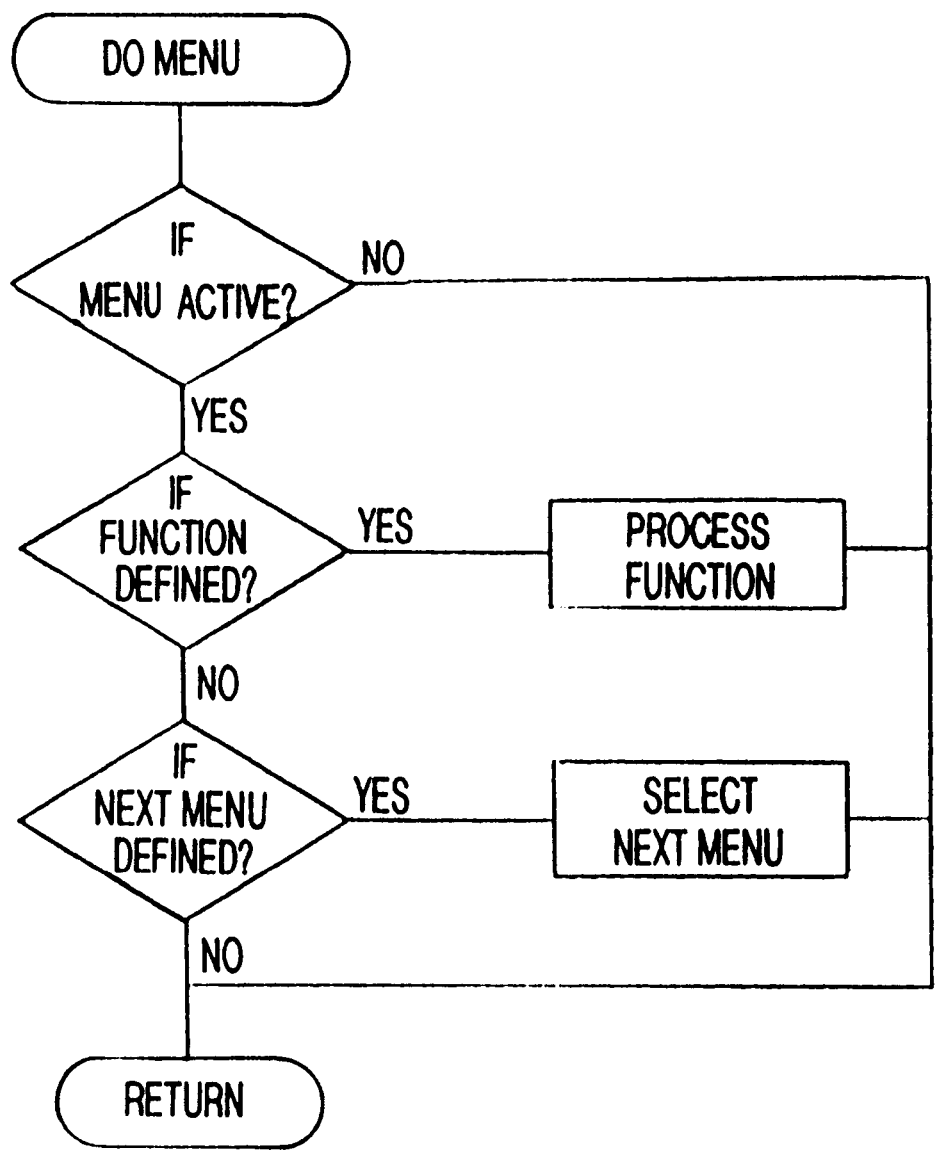
FIG. 12(a) is a flowchart of the general CDU menu process.
Figure 12B:
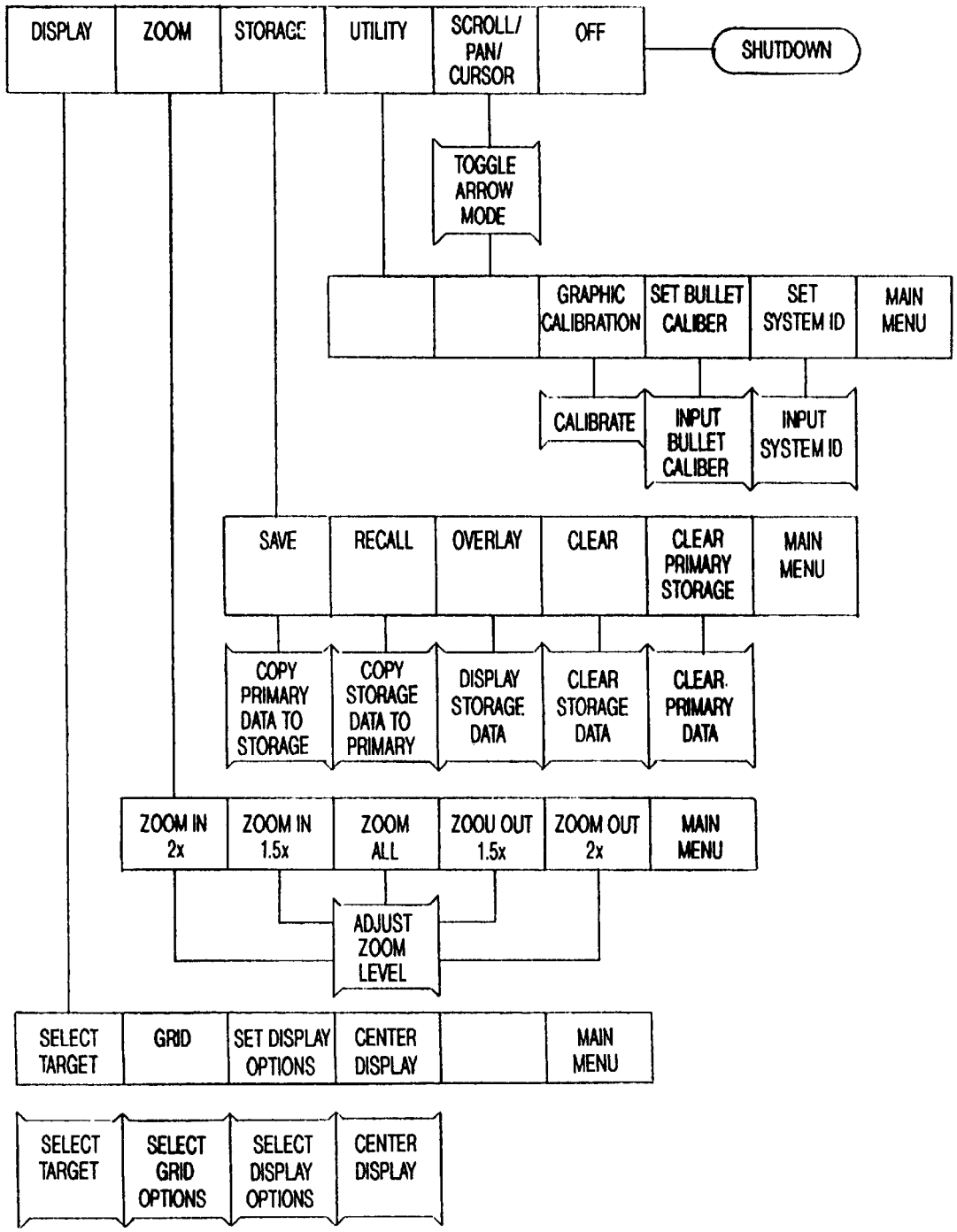
FIG. 12(b) is an organizational map of the CDU menu structure.
Figure 14:
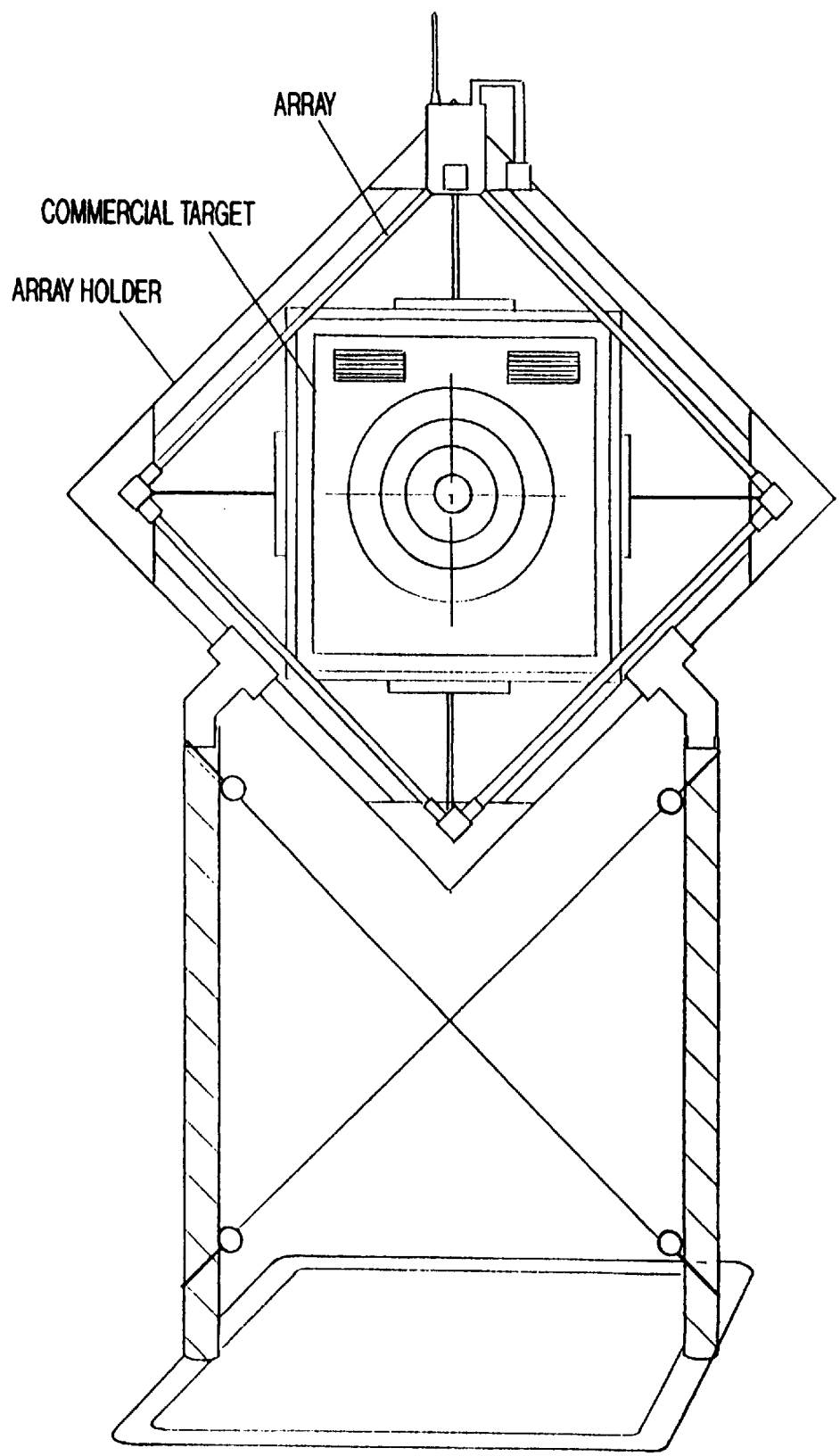
FIG. 14 is a front view of the stand of FIGS. 13(a) and (b) when assembled.
Figure 15:
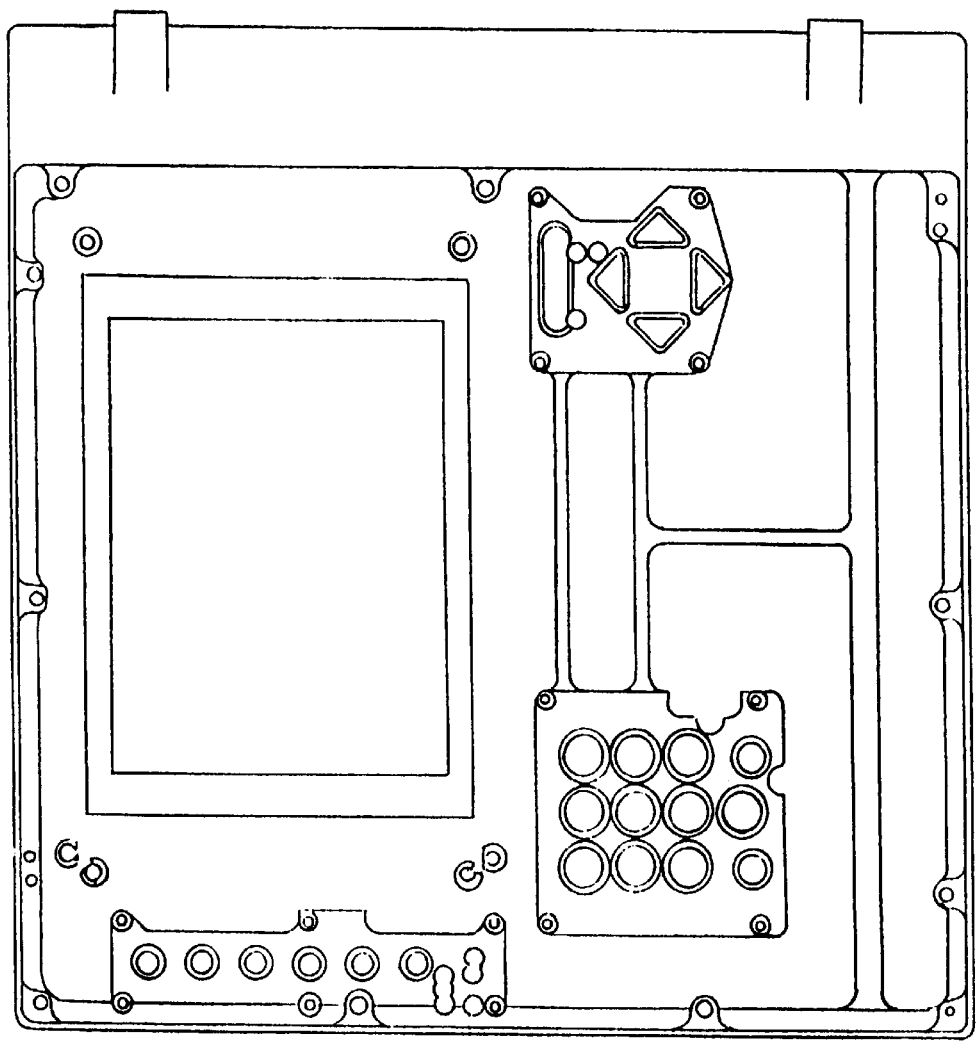
FIGS. 15(a)–(e) are schematic diagrams of CDU housing components including the face plate, battery holder, back plate stand, battery plug, and the RF shield cavity.
Figure 16:
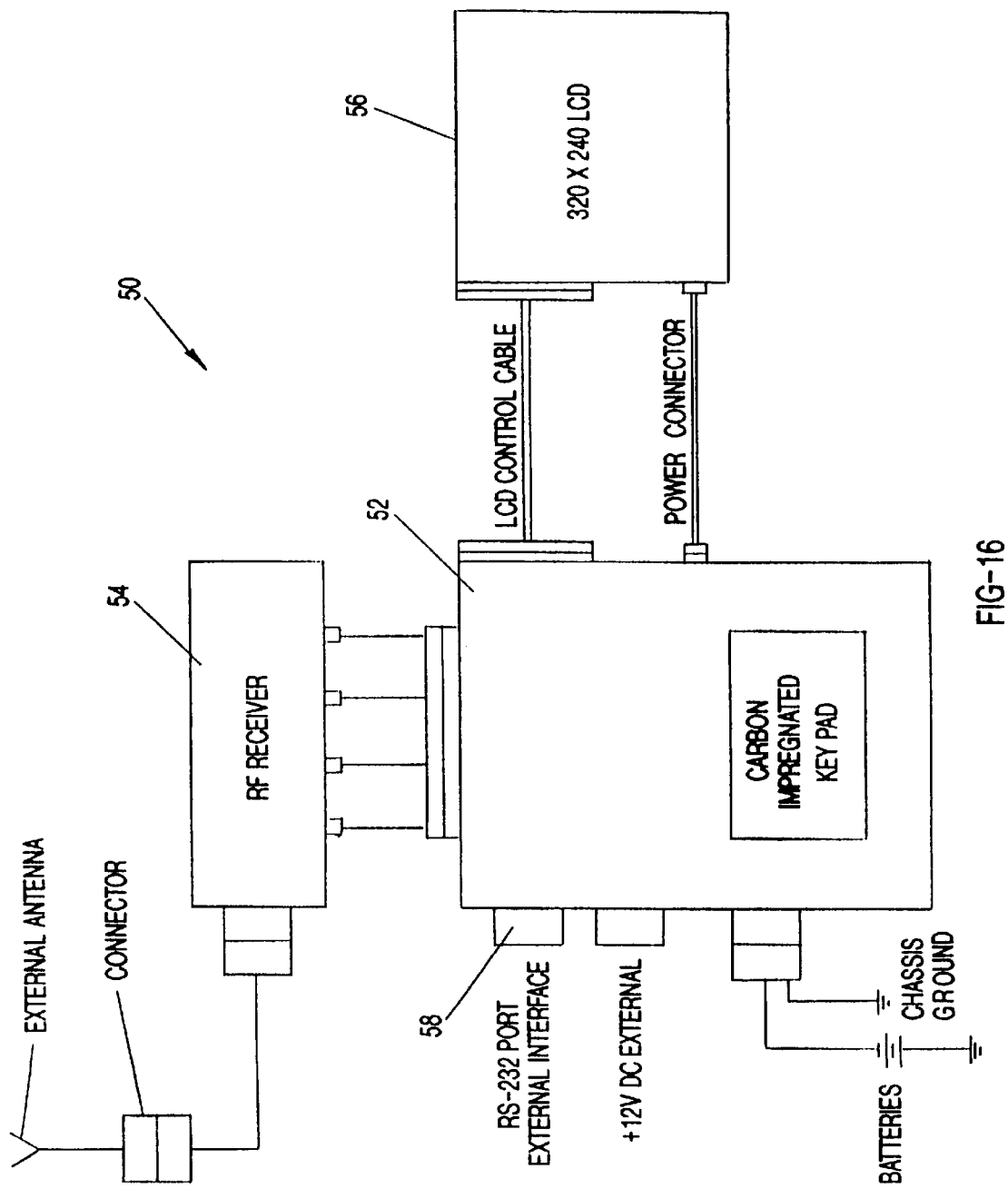
FIG. 16 is a block diagram of the CDU hardware.
Figure 17:
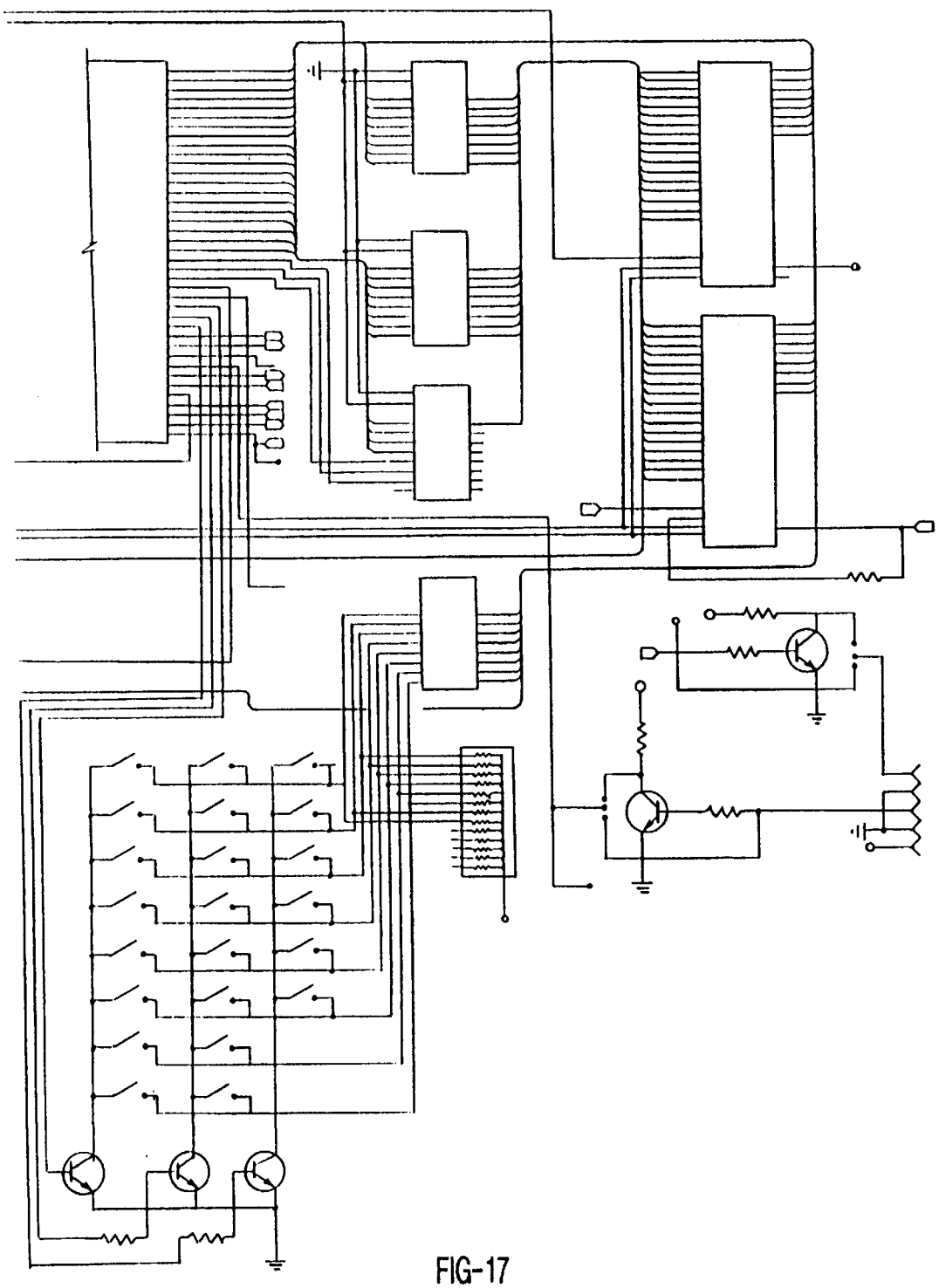
FIGS. 17(a) and (b) are schematics for the main board within the CDU, including microprocessor, 29f010 flash ROM, RS-232 serial interface, 900 MHz RF link, key pad, battery, step up/step down power converters, and external power interface.
Figure 17:
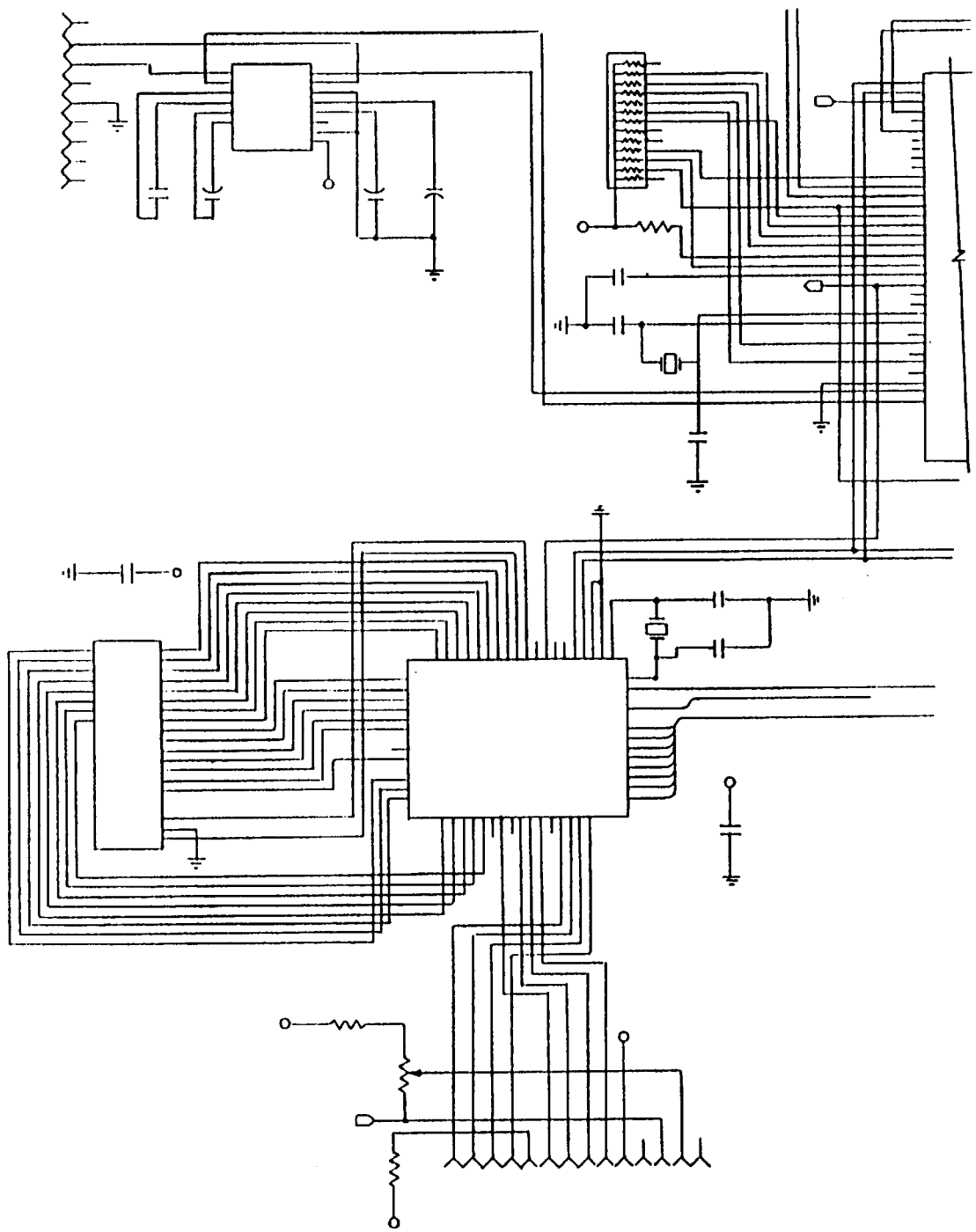
Figure 17:
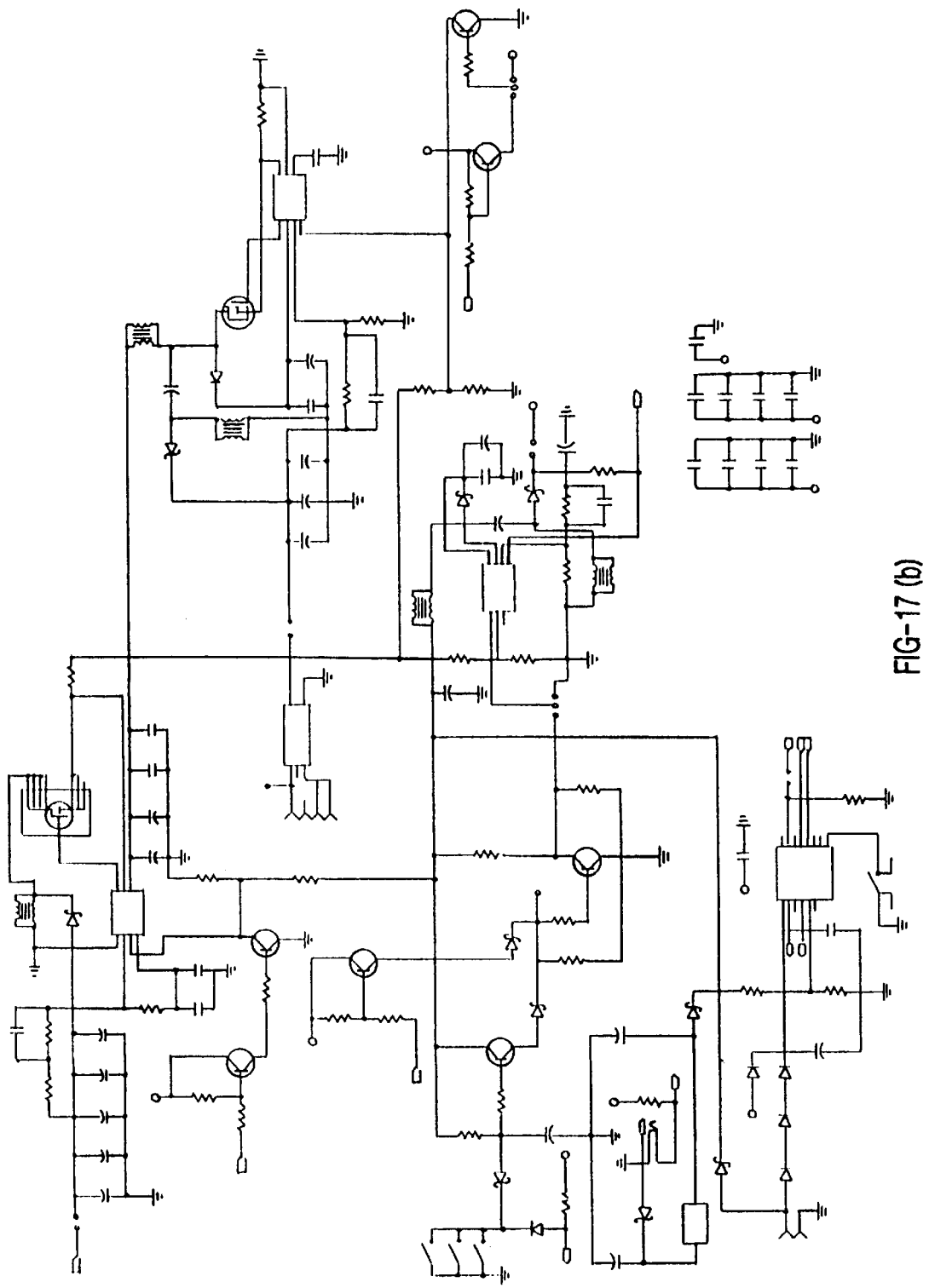
Figure 18:
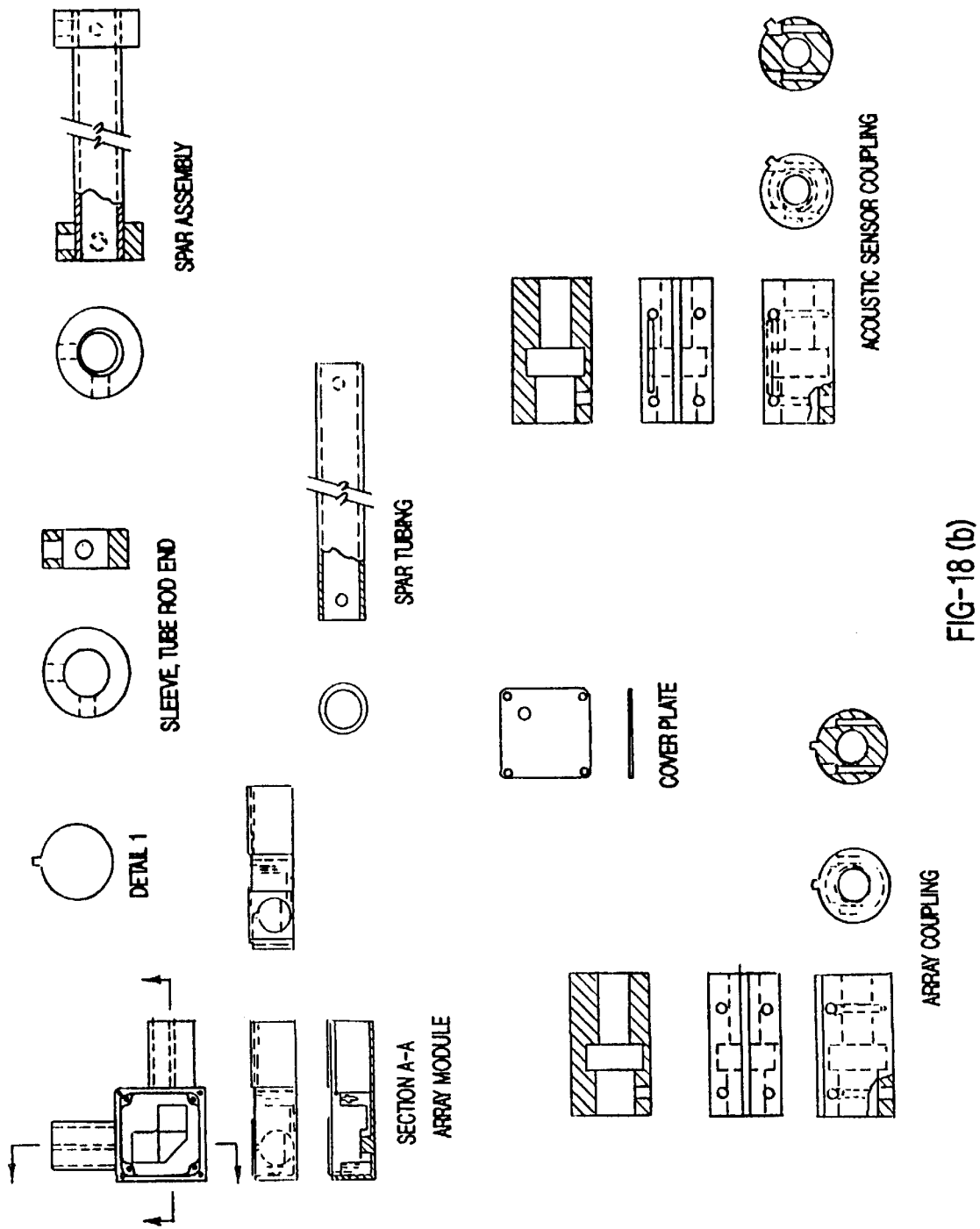
FIGS. 18(*a*) and (*b*) are schmatics of the sensor array components, including array control unit housing, battery housing lid, cover plate, antenna support bracket, switch/LED support bracket and spar/elbows sensor.
Figure 19:
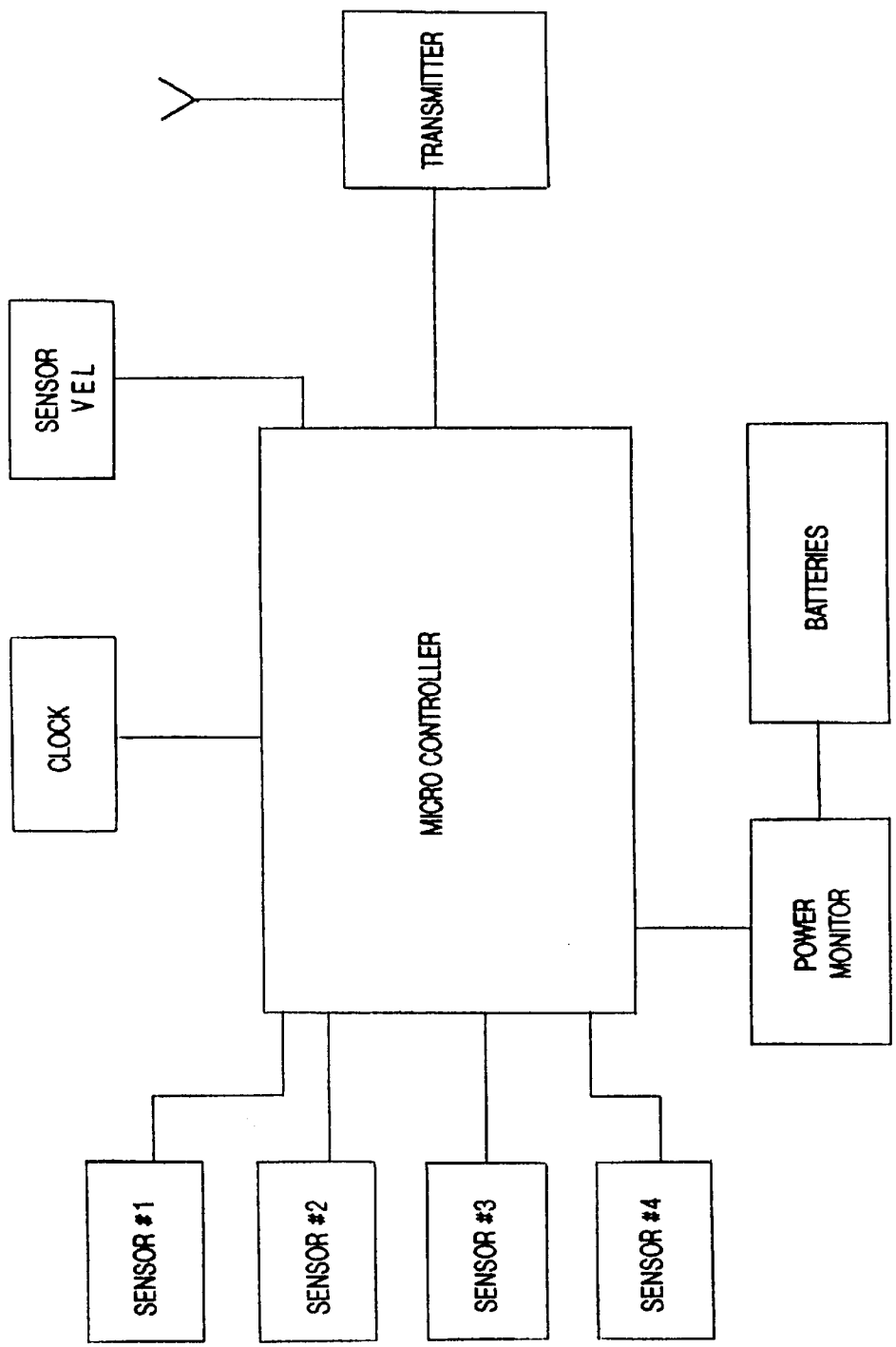
FIG. 19 is a block diagram of the sensor array hardware of the invention.
Figure 20:
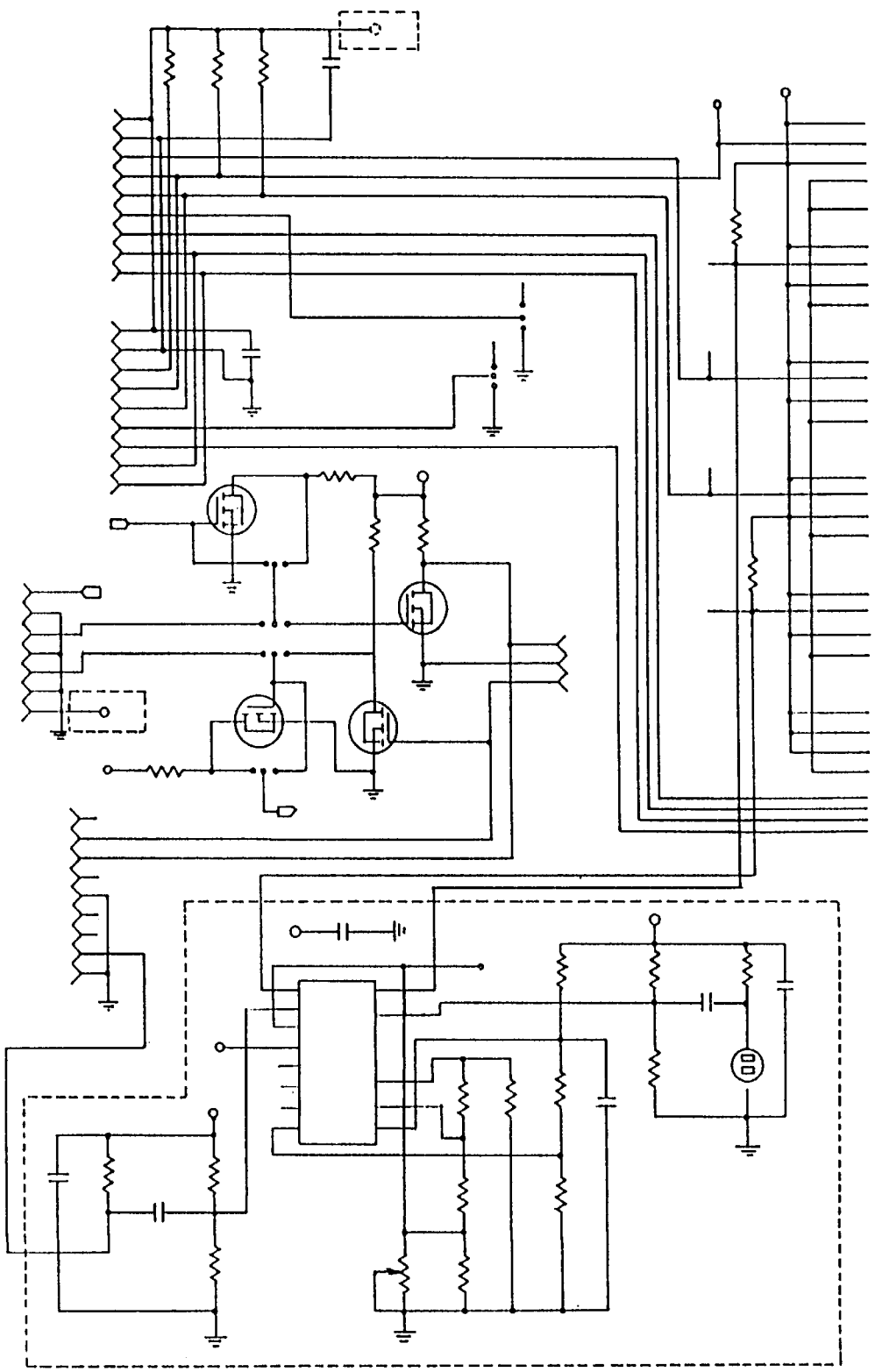
FIG. 20 is a schematic of the array sensor controller/transmitter PC board, including micro-controller, sensor interface circuitry, power converter, and transceiver.
Figure 20:
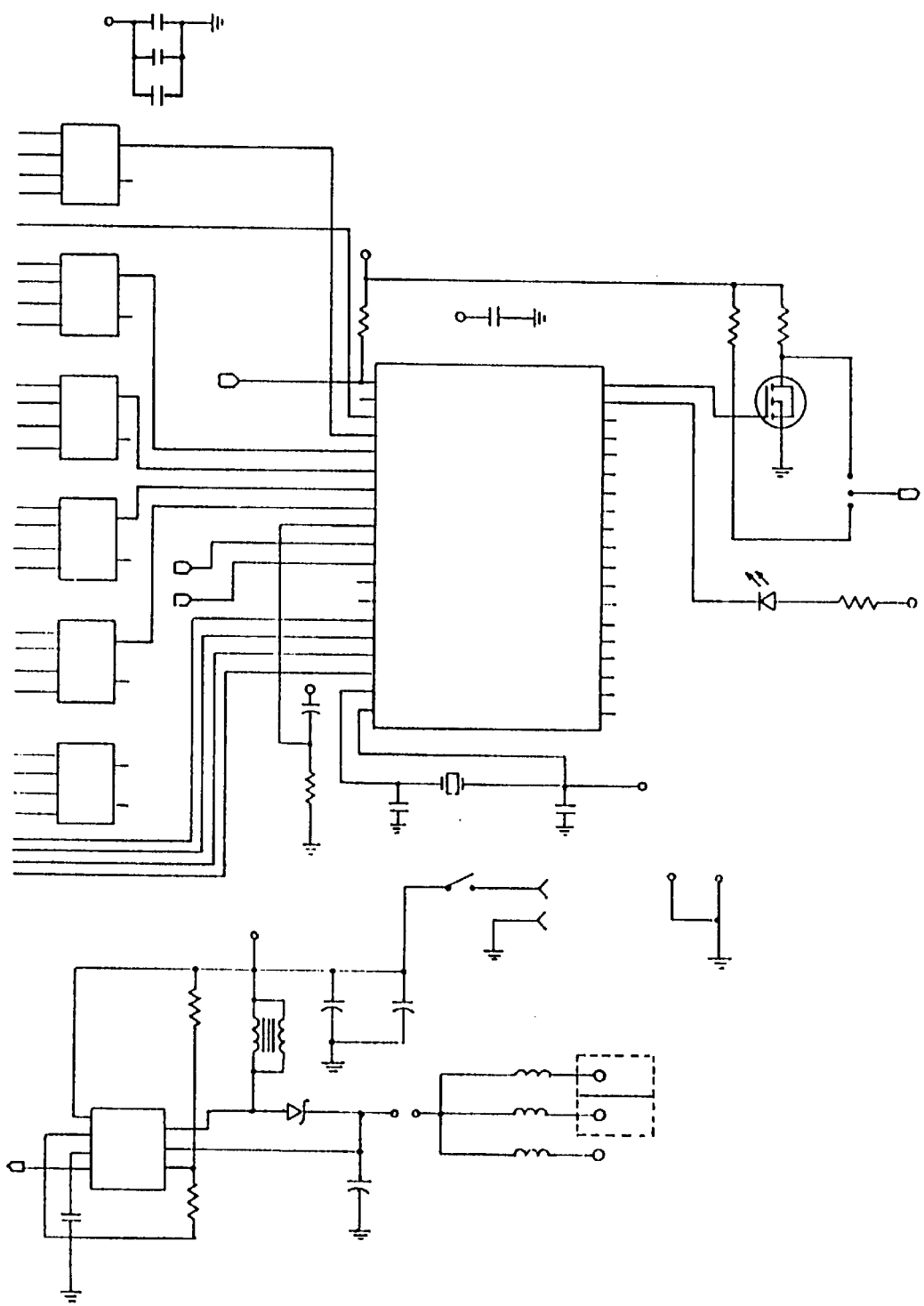
Figure 21:
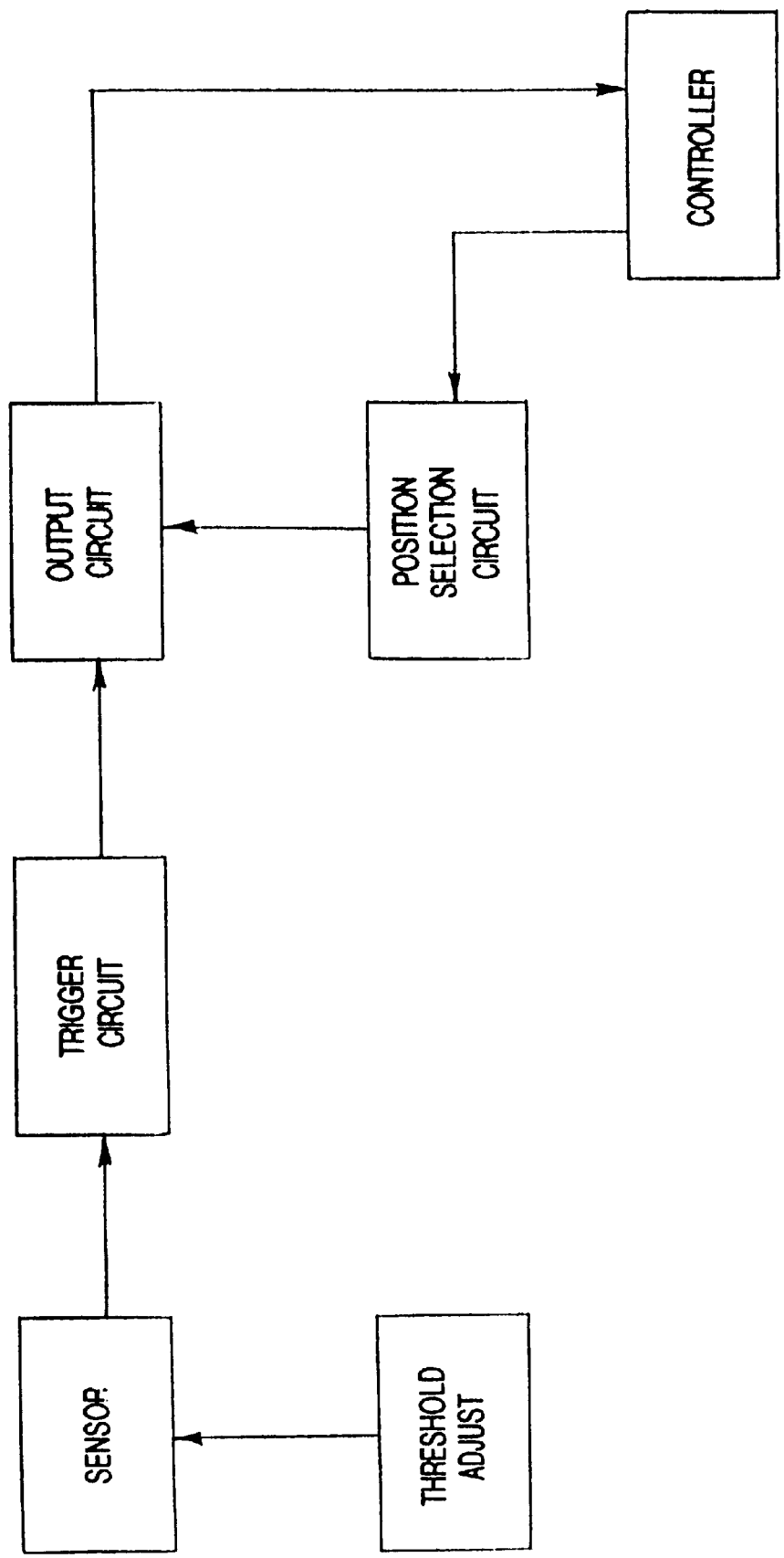
FIG. 21 is a block diagram of the sensor-elbow with circuitry for the matched pair acoustic traducers.
Figure 22:
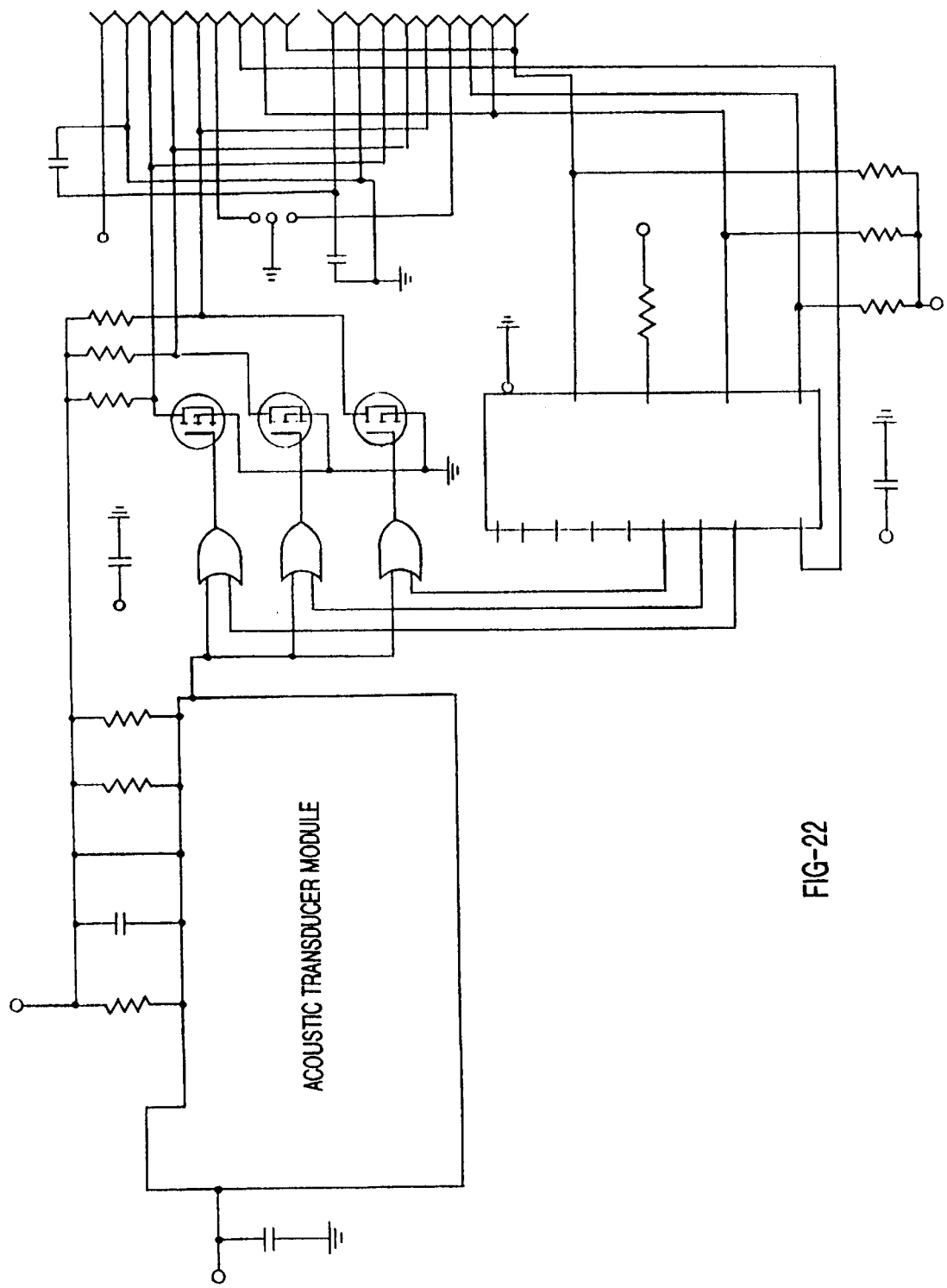
FIG. 22 is a schematic diagram of the sensor elbow.
Figure 23:
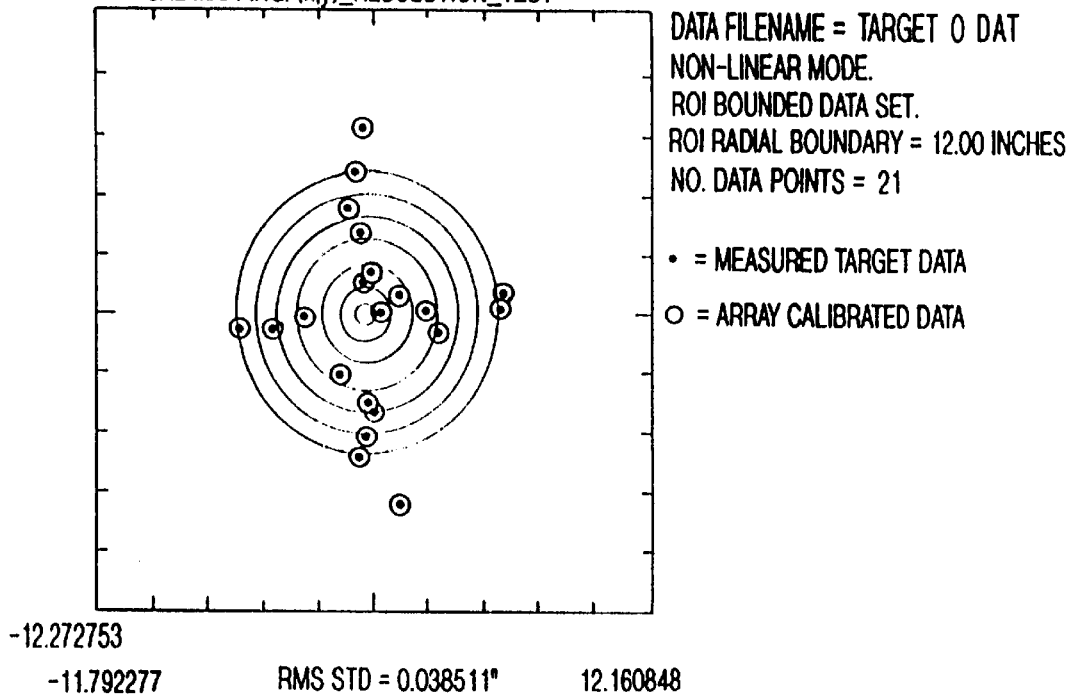
FIG. 23 is a compilation and plot of the resolution test for data set target0.dat.
Figure 24:
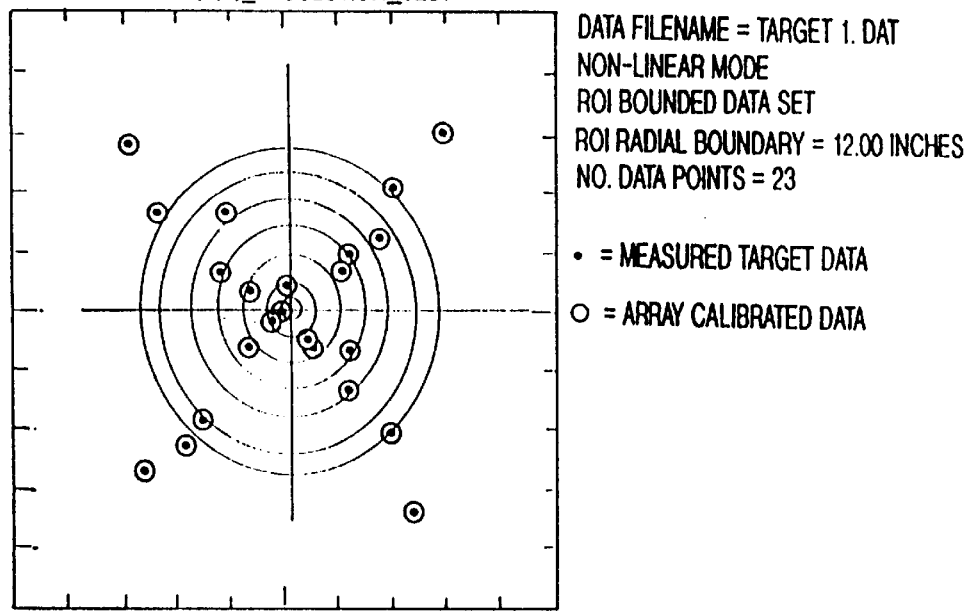
FIG. 24 is a compilation and plot of the resolution test for data set target1.dat.
Figure 25:
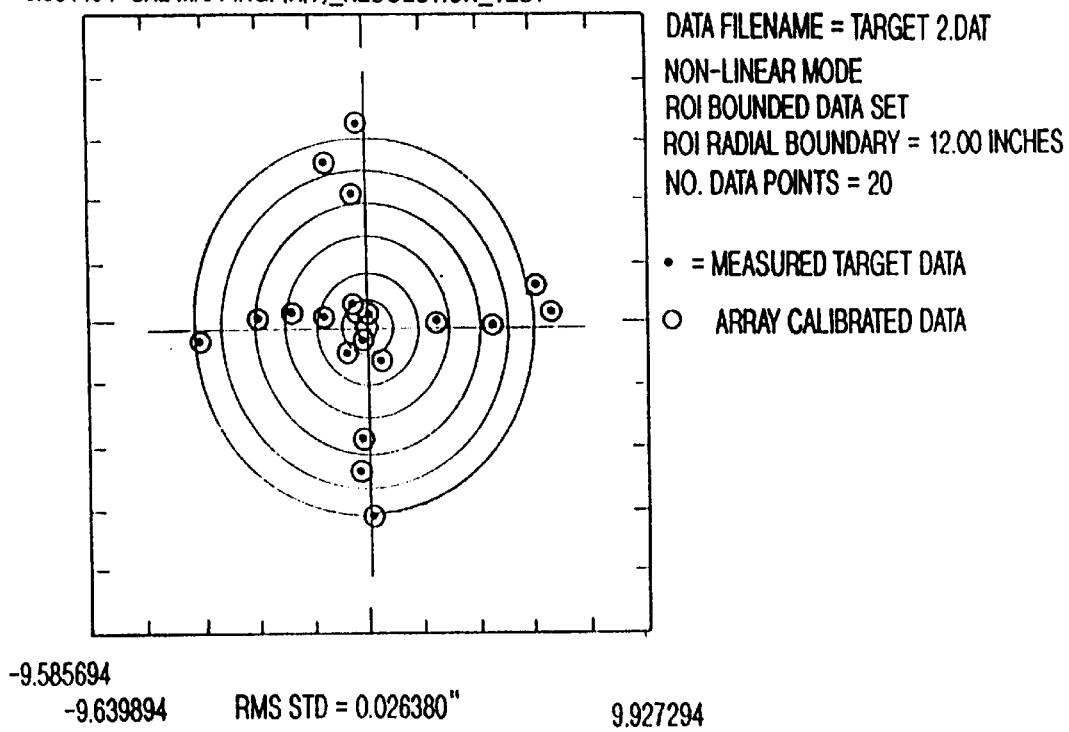
FIG. 25 is a compilation and plot of the resolution test for data set target2.dat.
Figure 26:
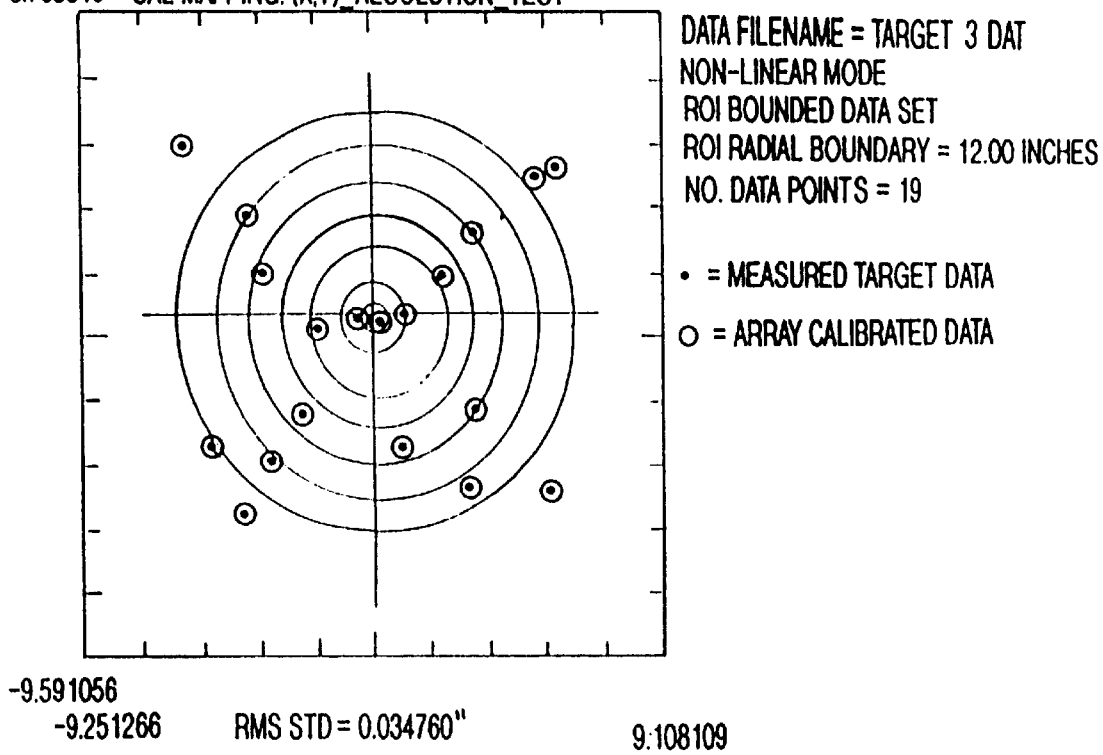
FIG. 26 is a compilation and plot of the resolution test for data set target3.dat.
Figure 27:
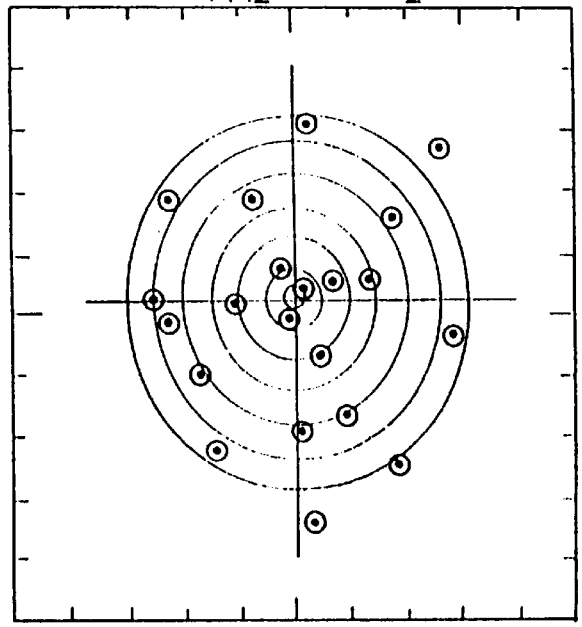
FIG. 27 is a compilation and plot of the resolution test for data set target4.dat.
Figure 28:
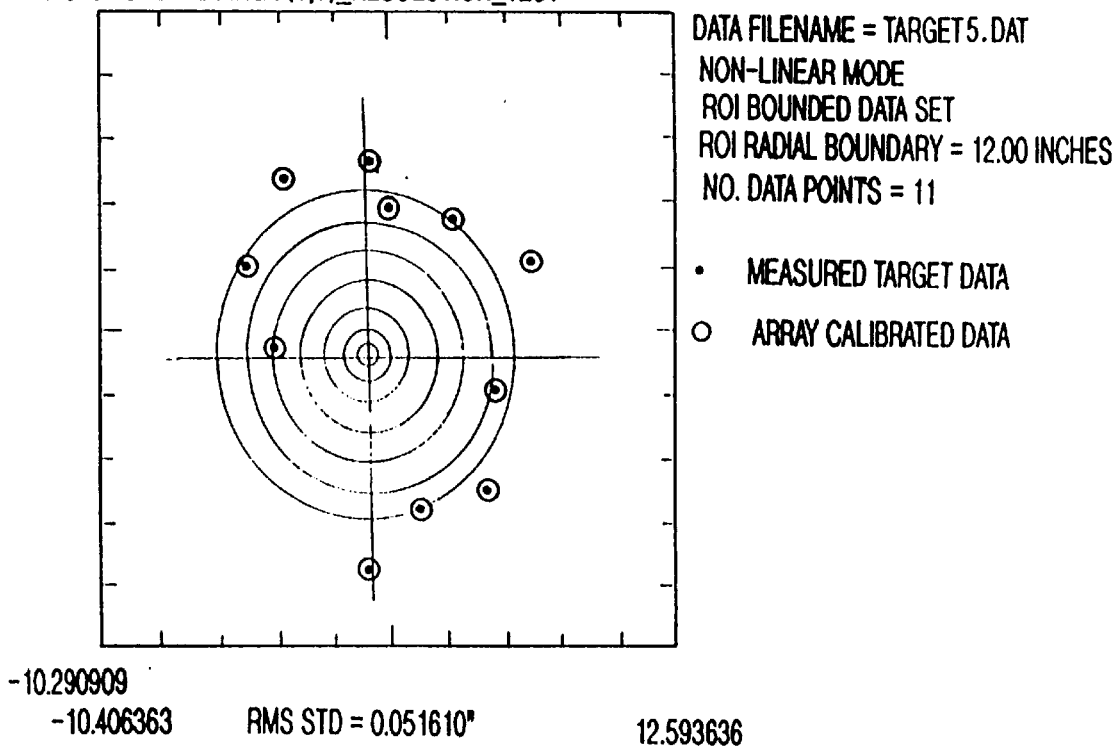
FIG. 28 is a compilation and plot of the resolution test for data set target5.dat.
Figure 29:
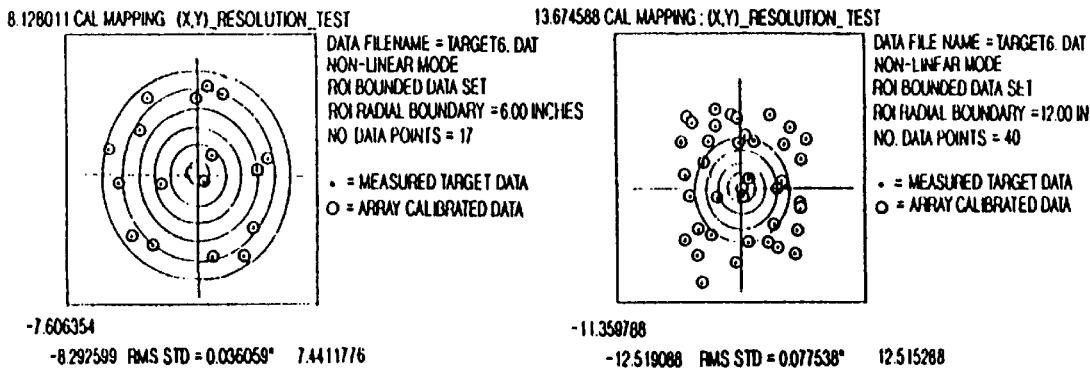
FIG. 29 is a compilation and plot of the resolution test for data set target6.dat.
Figure 30:
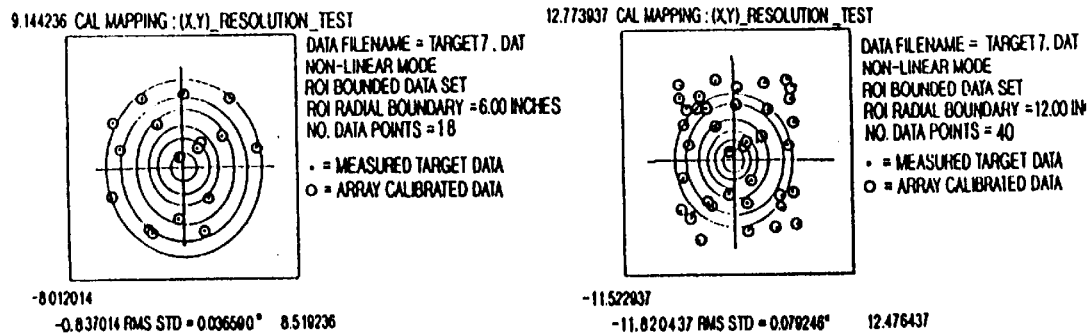
FIG. 30 is a compilation and plot of the resolution test for data set target7.dat.
Figure 31:
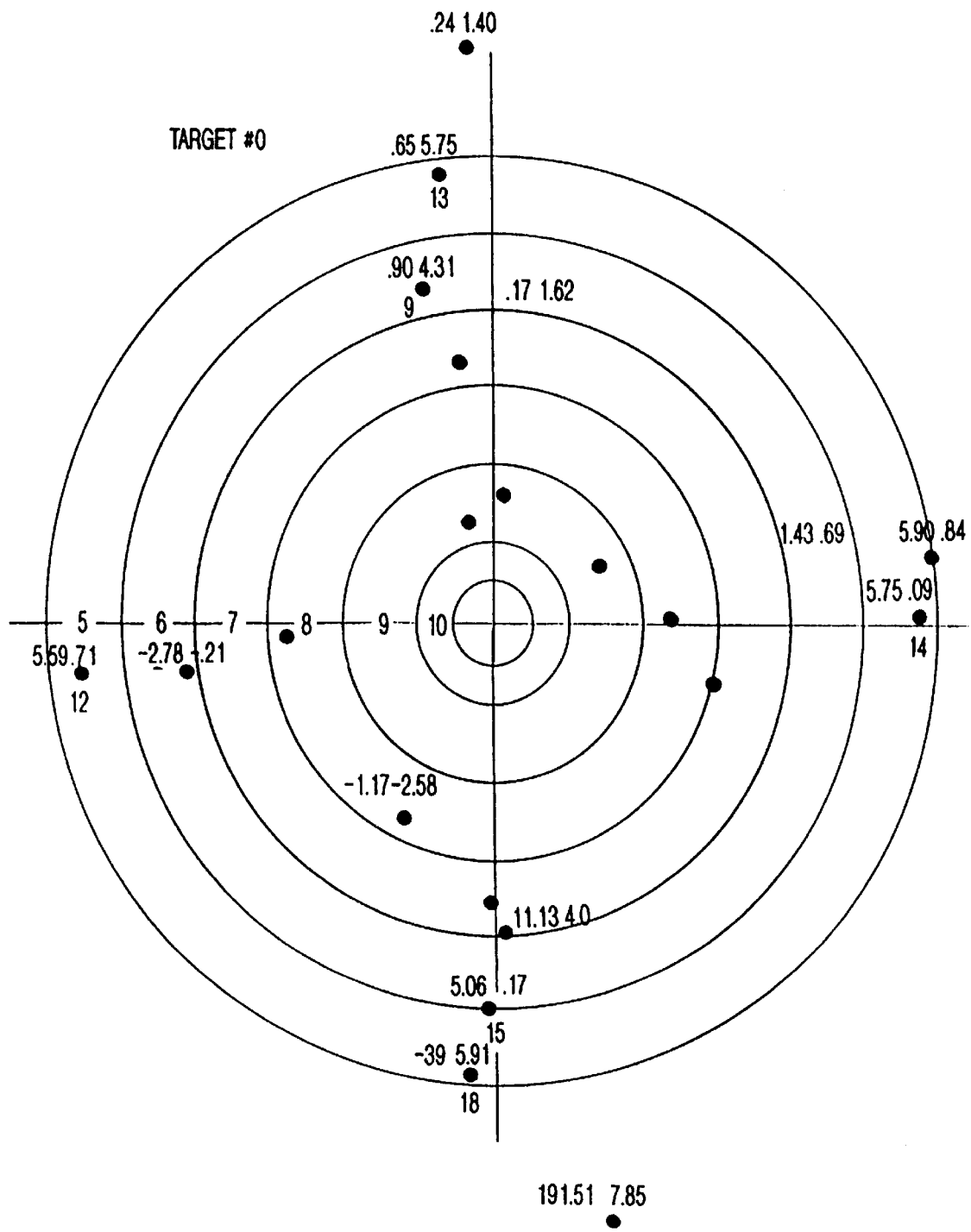
FIG. 31 is an image of actual target data generated during acquisition of target0.dat.
Figure 32:
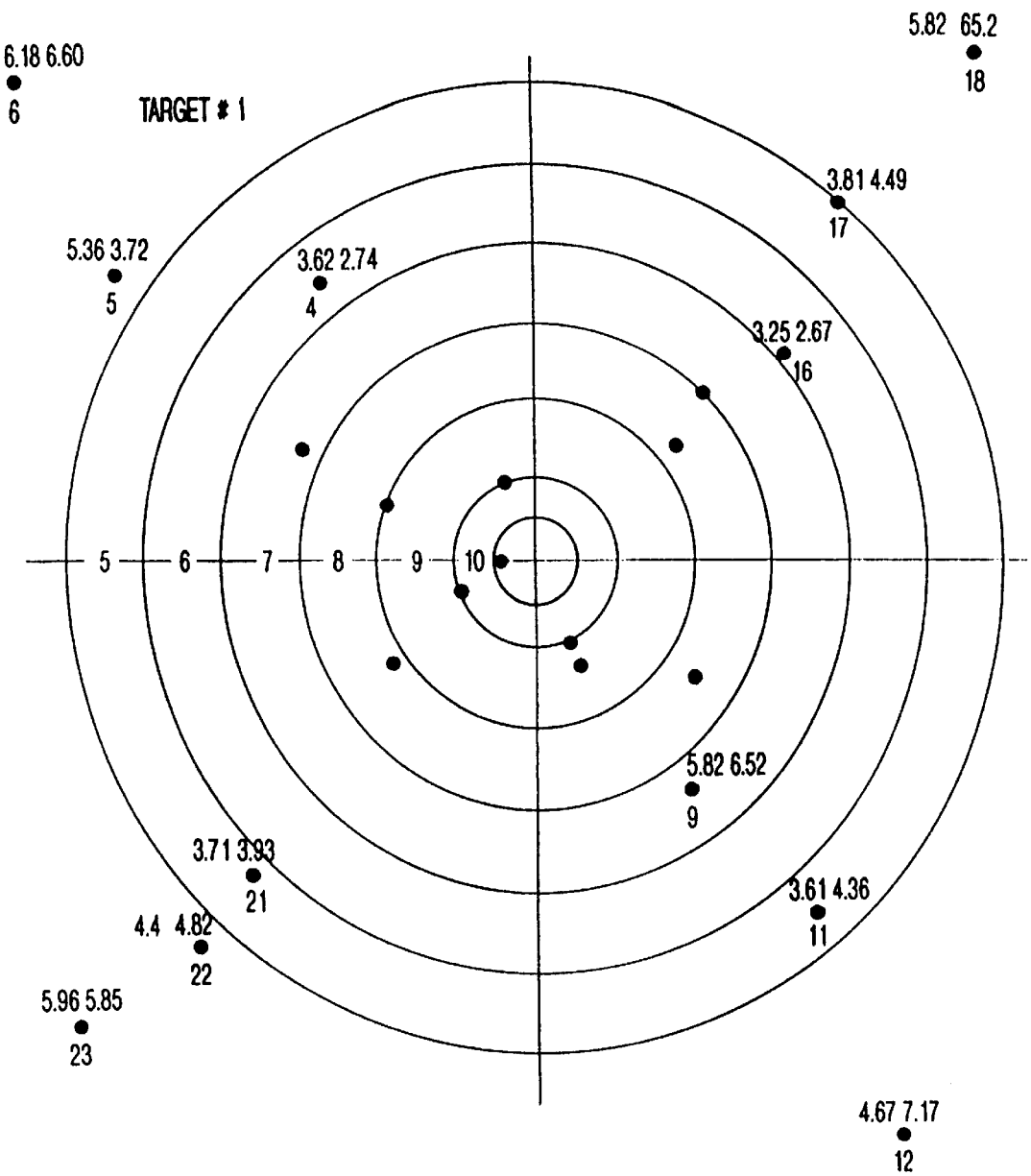
FIG. 32 is an image of actual target data generated during acquisition of target1.dat.
Figure 33:
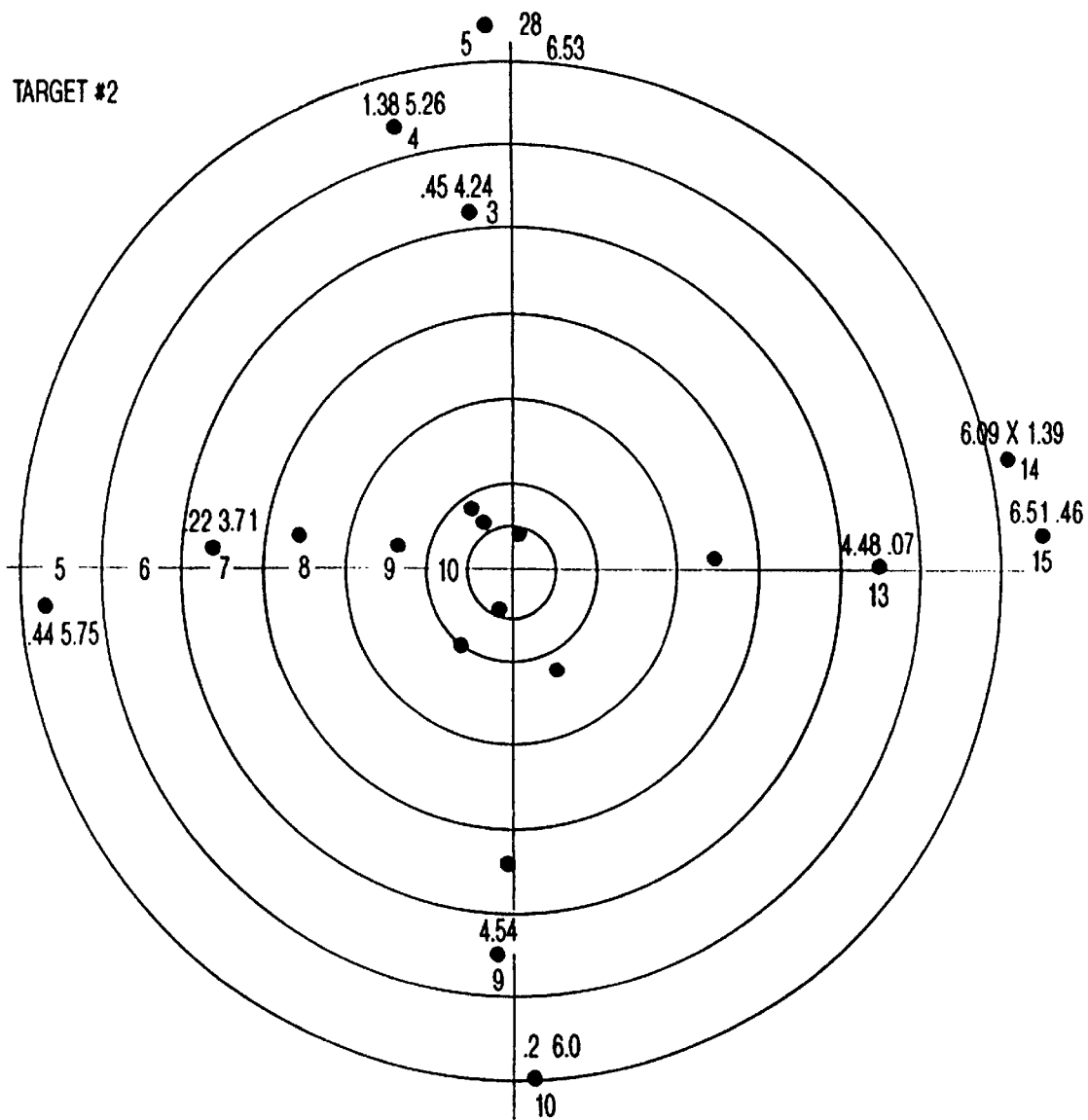
FIG. 33 is an image of actual target data generated during acquisition of target2.dat.
Figure 34:
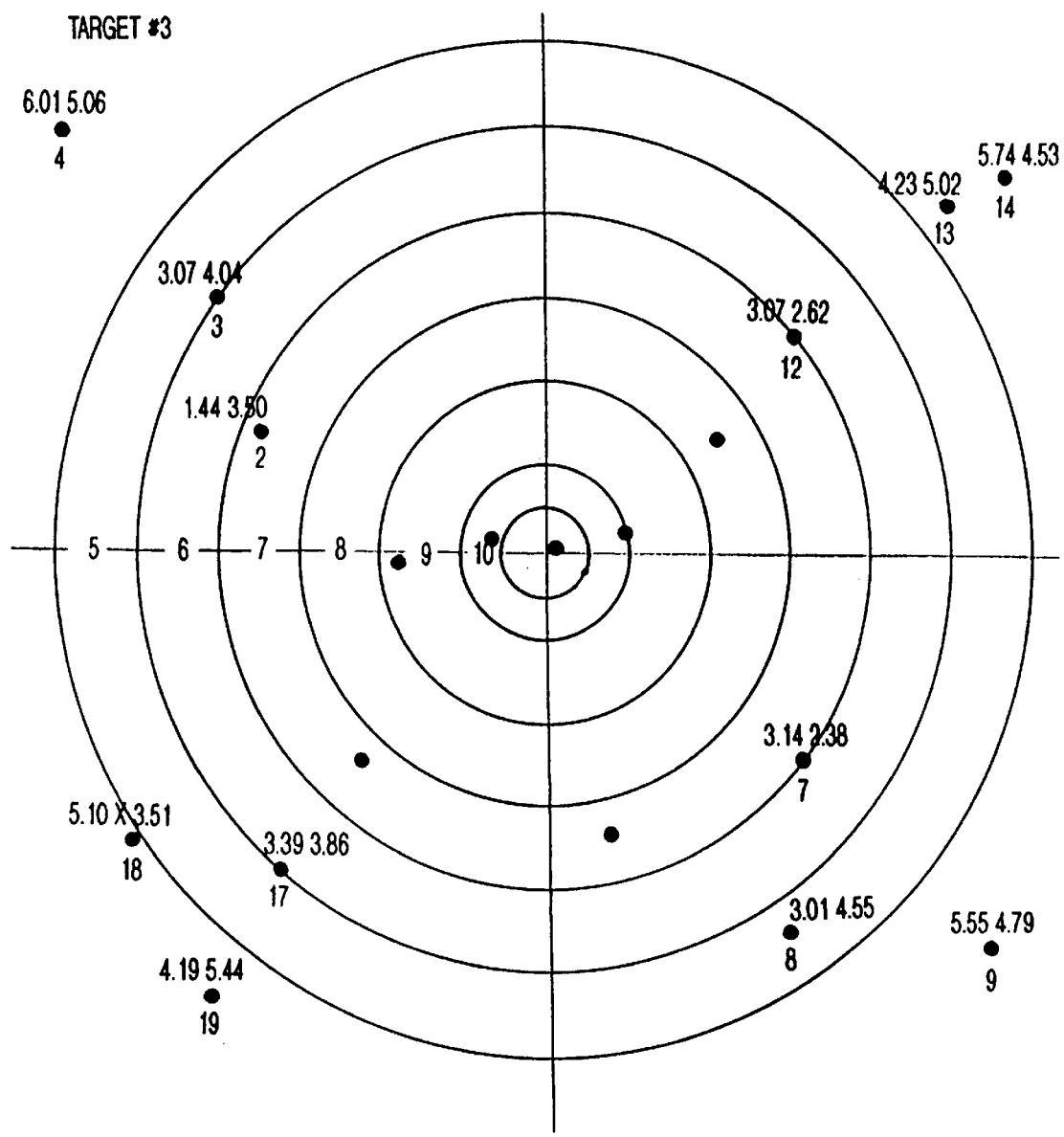
FIG. 34 is an image of actual target data generated during acquisition of target3.dat.
Figure 35:
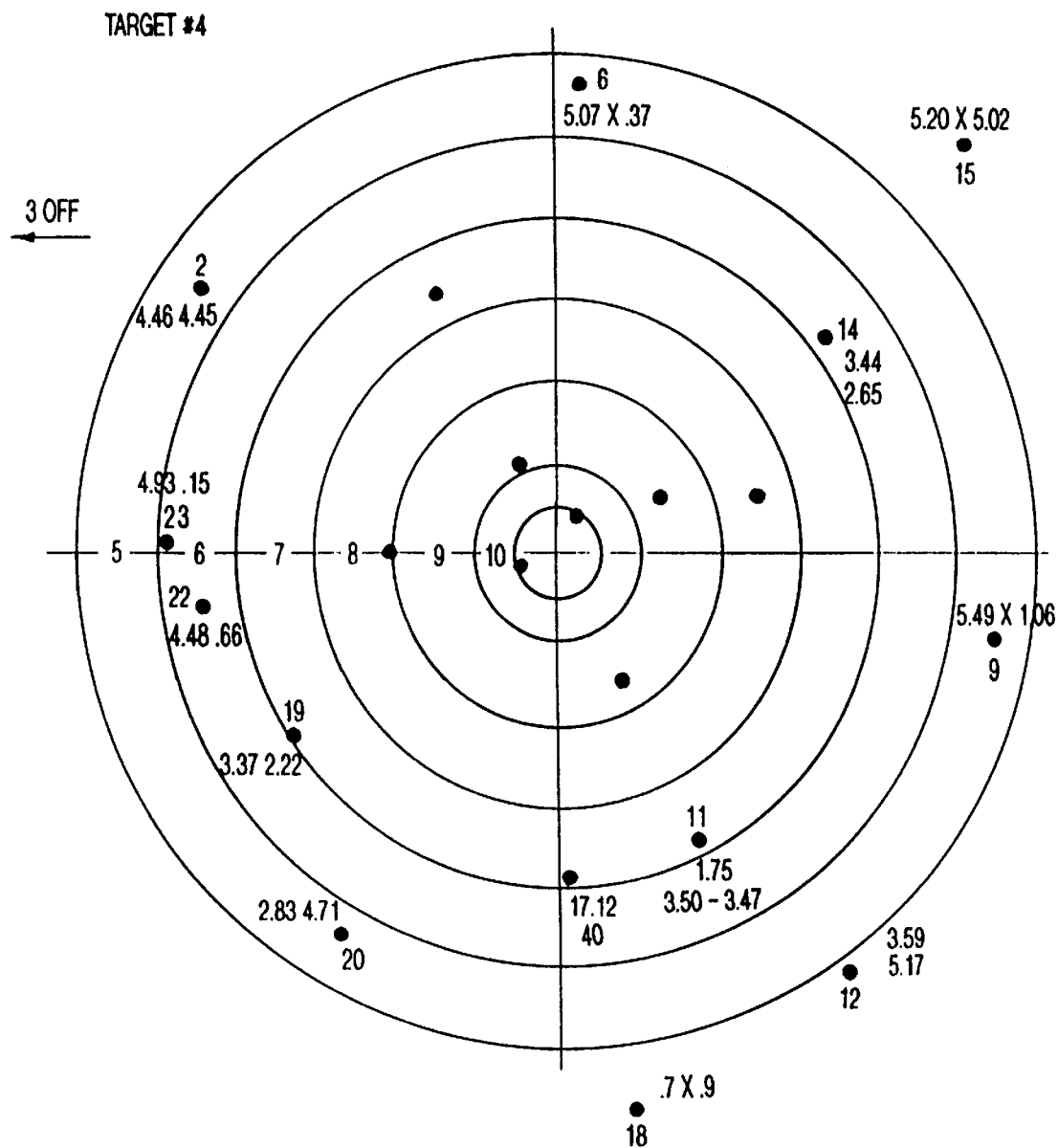
FIG. 35 is an image of actual target data generated during acquisition of target4.dat.
Figure 36:
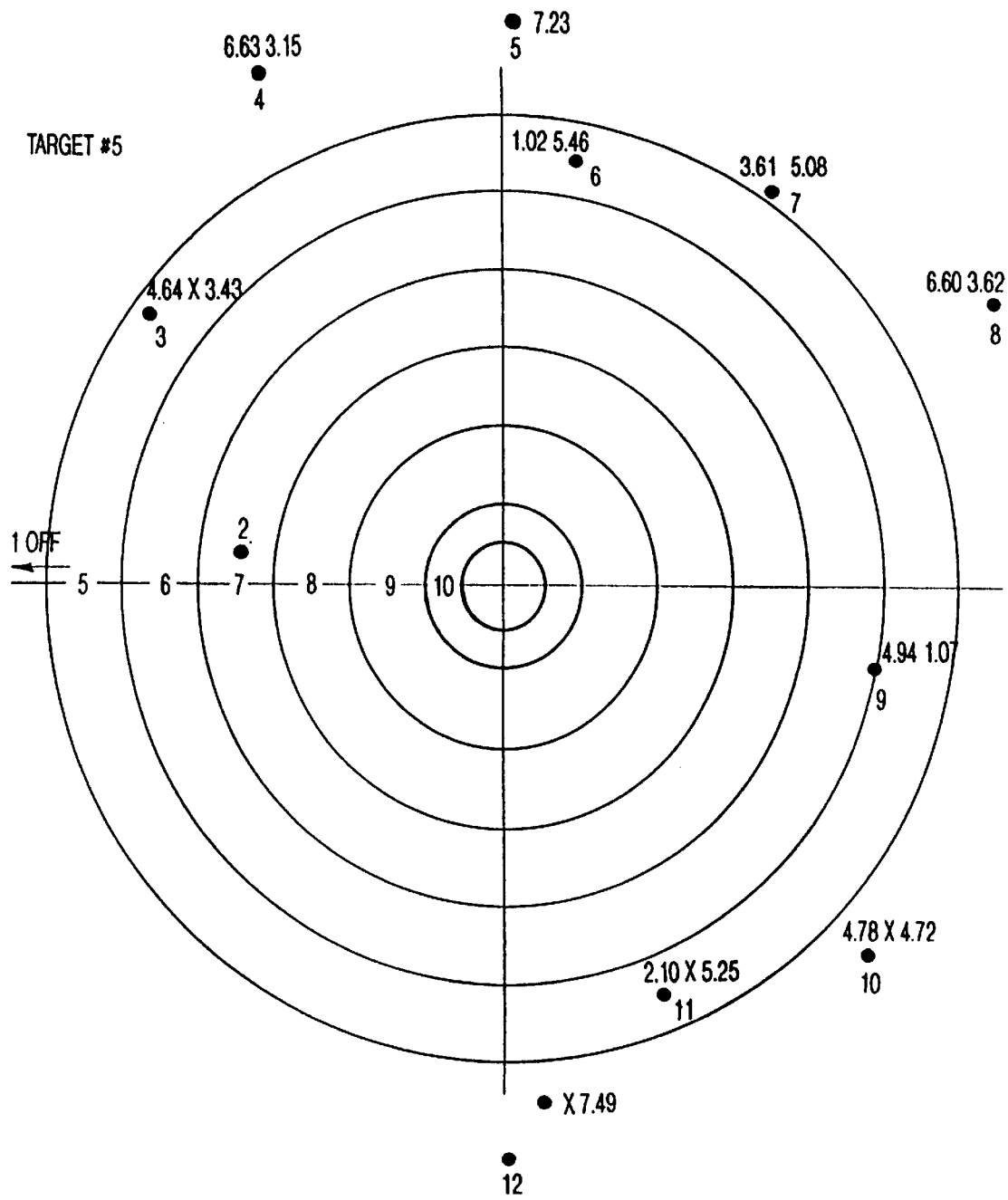
FIG. 36 is an image of actual target data generated during acquisition of target5.dat.
Figure 37:
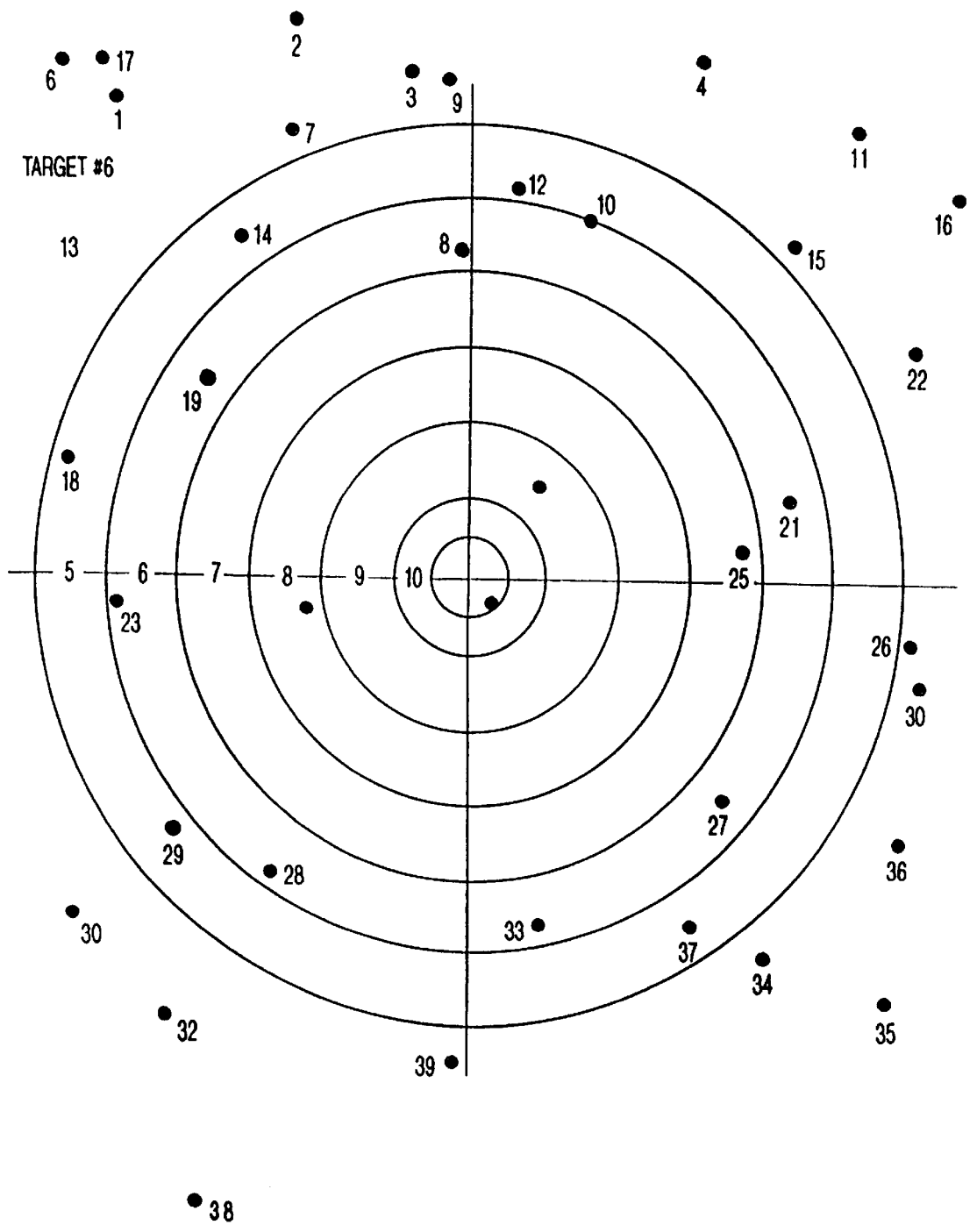
FIG. 37 is an image of actual target data generated during acquisition of target6.dat.
Figure 38:
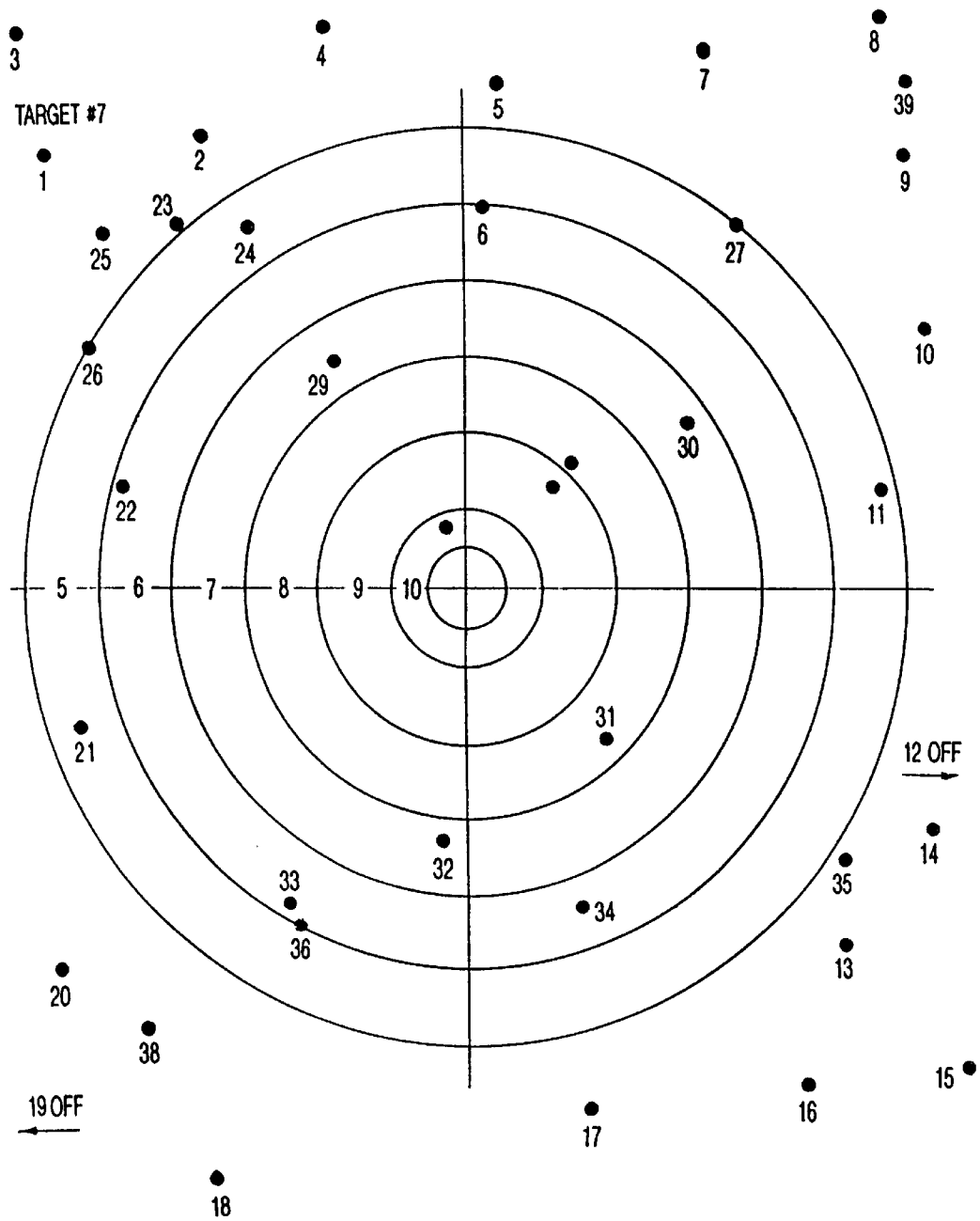
FIG. 38 is an image of actual target data generated during acquisition of target7.dat.

The base station CDU shown in FIG. 3, and contains a wireless radio data link receiver, a microprocessor for shot pattern analysis and control of the 320×240 liquid crystal display (LCD) graphical/numerical display. Overall process control, defined by software controller code resident on the microprocessor, is shown in FIGS. 4–12, for the (1) main loop process flow, (2) idle loop process flow, (3) host command processing, (4) array message processing, (5) switch input processing, (6) keypad arrow control, and (7) menu along with the menu map. Mechanical design, block layouts and electronic circuits are shown in FIGS. 15–17. For stationary testing, an array mounting stand 60 was designed and implemented. This is shown in FIGS. 13–14.

The present invention uses a completely different sensing array configuration than shown in the prior art. It relies entirely on the high-resolution measurement of the shock front shape and time motion differentials and initial calibration information. The invention uses two independent planar-orthogonal channels for placement triangulation, and a single cross-orthogonal channel for velocity determination on a sampling interval (e.g., 350 nanosecond). This provides for optimal spacial resolution without the introduction of less effective and less accurate timing cross-term components derived from a multi-sensor directional cross-coupled configuration.

Each discrete acoustic sensor samples a single point on the surface of the shock cone measuring its time response function and characteristic profile. The data is, by virtue of the array geometry, organized in an orthogonal Cartesian coordinate system to ensure independence and separability in sensor measurements. This eliminates the need for cross-dependent projection remapping terms other than rotational and transnational components. Choice of this type of configuration was based on the truism that there exists an inherent fundamental positional uncertainty built into the prior art where restrictions and limits on the dynamic range of placement projections resulted from directional based design configurations where directional triangularization aspects do not allow for equal aspect in orthogonal direction resolution. The present invention avoids this problem entirely and optimizes for accuracy by equalizing its sensor spacial resolution aspect, thereby minimizing cross-term correction effects by setting its sensors orthogonal to each other and measuring their parameters independently. This design simplifies timing electronics and allows for faster real-time at-the-array analysis rates.

The time-amplitude profile of the acoustical shock front impingement on each microphone sensor is recorded and subjected to a simple shape analysis for event discrimination and triggering. The primary pulse (not late time ringing) of the sensor signal is analyzed as regards its rise-time, peak amplitude, full-width at half height and long-time decay profile. These parameters provide necessary input for determining the type of event and the relative trigger time differential offset; which, when compared with its matched pair companion, provides an array based timing differential reported as one of the array time-directional coordinates.

A fast calibration transform is incorporated within the invention to correct for the projectile-array intersection point measurement as regards visual CDU display translation, rotation and resolution limits based on the number of discrete sampling sensors. The resulting positional coordinates are therefore subjected to an array-sourced, non-linear multi-order cross-detection field correction procedure to account for velocity dependent variations in the shock front time and space profile. This unique calibration transform enables the present invention to maintain extremely high placement and velocity measure resolutions. Array coordinates are relayed in absolute time differentials, relative to the array sensor center, in units based on the array microprocessor clock frequency. This tunable frequency is currently set to 2.76475 MHz. The calibration transform converts these time coordinates into spacial coordinates consistent with physical targets placed within the array sensor field. The calibration transform is based on the comparison of a set of correlated data measurements between array-time coordinates and spacial-target coordinates, which represent the measurement of the same events in two different coordinate systems. Translation, rotation, scale extent and weighted off-field correction terms are convoluted together to form a correction transform matrix which is used to convert array measurements to target placements.

Industrial Applicability

The invention is further illustrated by the following non-limiting examples.

EXAMPLES 1–8

Table 3 tabulates the results from a series of eight resolution measurements derived using a 55 grain 0.223 caliber projectile over a range of 100 yards.

TABLE 3

ARRAY SENSOR RESOLUTION RESULTS
Radial$_{(X,Y)}$ RMS deviation measurements, in inches,
for data derived from a series of tests using a 55 grain,
0.223 caliber projectile at a range of 100 yards

| Array Data (6" radial) | Linear Calibration Correction | Non-Linear Calibration Corrected |
|---|---|---|
| Target0 | 0.036 | 0.038 |
| Target1 | 0.054 | 0.038 |
| Target2 | 0.037 | 0.026 |
| Target3 | 0.033 | 0.034 |
| Target4 | 0.060 | 0.041 |
| Target5 | 0.066 | 0.052 |
| Target6 | 0.033 | 0.037 |
| Target6 (>12" radial) | 0.078 | 0.076 |
| Target7 | 0.047 | 0.037 |
| Target7 (>12" radial) | 0.079 | 0.079 |
| | for placement within a 6" radius about the center axis of the array: ave = 0.046" | for placement within a 6" radius about the center axis of the array: ave = 0.038" at a 17.4% improvement in resolution |
| | min = 0.033" max = 0.066" | min = 0.026" max = 0.052" |
| | for placement within a 12" radius from the center axis of the array: ave = 0.055" | for placement within a 12" radius from the center axis of the array: ave = 0.048" at a 12.7% improvement in resolution |
| | min = 0.026" max = 0.079" | min = 0.026" max = 0.079" |

In general, within a six inch radius from the center the array or along the axial lines, the array has demonstrated a placement accuracy of 0.038 inches deviation from actual bullet target holes. For a range up to twelve inches from the center of the array, the placement accuracy of 0.048 inches deviation from actual bullet target holes has been achieved. The measured target data, array calibrated data, and CDU graphical plot of the data for the eight examples are shown in FIGS. 23–30. The actual targets for the eight examples are shown in FIGS. 31–38.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A remote sensing apparatus comprising:
a sensor array surrounding a projectile target for sensing a supersonic shock cone prior to a projectile impacting a target, said sensor array comprising at least two pairs of independent orthogonally matched acoustical sensors for detecting a single point on the trajectory of said projectile from a single circular wave generated by said supersonic shock cone based on a absolute time differential of each sensor relative to the center of the sensor array, supersonic projectile impact data computation means, and data transmission means; and
a controller comprising data reception means and data display means.

2. The apparatus of claim 1 wherein said data transmission and reception means comprise RF data transmission and reception means.

3. The apparatus of claim 2 wherein said RF data transmission and reception means operate at a frequency of between approximately 902 and 928 MHz.

4. The apparatus of claim 2 wherein said controller comprises RF Faraday cage shielding.

5. The apparatus of claim 1 wherein said data transmission and reception means comprise collision avoidance means permitting multiple remote targeting apparatus to operate in a vicinity of one another.

6. The apparatus of claim 1 wherein said data display means comprises graphical data display means simulating a target and projectile impact locations thereon.

7. The apparatus of claim 6 wherein said graphical data display means operates in real-time.

8. The apparatus of claim 1 wherein said projectile impact data computation means comprises means for calculating projectile impact locations within twelve inches of a center of said projectile target to an average RMS accuracy of less than approximately fifty thousandths of an inch.

9. The apparatus of claim 1 wherein said projectile impact data computation means comprises means for calculating projectile impact locations in an orthogonal Cartesian coordinate system.

10. The apparatus of claim 1 further comprising means for determining velocity of the projectile.

11. The apparatus of claim 10 wherein said velocity determination means comprises an additional sensor at a predetermined distance from said sensor array which measures a difference in time between the projectile passing said additional sensor and said sensor array.

12. The apparatus of claim 1 additionally comprising means for correcting for velocity dependent variations in projectile shock front characteristics.

13. The apparatus of claim 1 additionally comprising means for correcting for data display means translation, rotation, and resolution differences with respect to said projectile target and said sensor array.

14. The apparatus of claim 1 wherein said pairs of acoustical sensors comprise two pairs of acoustical transducers placed in a plane at cardinal compass points of said projectile target.

15. The apparatus of claim 14 wherein said pairs of acoustical sensors comprise an additional acoustical transducer orthogonal to said two pairs.

16. The apparatus of claim 15 wherein said projectile impact data computation means comprises means for computing projectile velocity from data provided by said additional acoustical transducer and a paired acoustical transducer.

17. The apparatus of claim 1 wherein each of said sensors is located within an elbow of a housing.

18. The apparatus of claim 17 wherein said housing comprises arms connecting said elbows, which arms and elbows are modular.

19. The apparatus of claim 1 wherein said pairs of acoustical sensors comprise acoustical microphones.

20. A sensor system apparatus for a projectile target for detecting a single point on the trajectory of said projectile from a single circular wave generated by the supersonic shock cone prior to a projectile impacting a target based on a absolute time differential of each sensor relative to the center of the sensor array, said apparatus comprising means for calculating supersonic projectile impact locations within twelve inches of a center of said projectile target to an average RMS accuracy of less than approximately fifty thousandths of in inch.

21. The apparatus of claim 20 wherein said apparatus comprises a sensor array surrounding a projectile target for sensing the projectile trajectory prior to said projectile impacting a target, said sensor array comprising at least two independent orthogonally matched acoustical sensors.

22. The apparatus of claim 21 wherein said sensor array surrounding a projectile target comprises at least two pairs of independent orthogonally matched acoustical sensors.

23. The apparatus of claim 22 wherein said pairs of acoustical sensors comprise two pairs of acoustical transducers placed in a plane at cardinal compass points of said projectile target.

24. The apparatus of claim 22 wherein said pairs of acoustical sensors comprise an additional acoustical transducer orthogonal to said two pairs.

25. The apparatus of claim 24 wherein said projectile impact data computation means comprises means for computing projectile velocity from data provided by said additional acoustical transducer and a paired acoustical transducer.

26. The apparatus of claim 23 wherein said sensors of said two pairs of acoustical sensors are located within four elbows of a diamond-shaped housing.

27. The apparatus of claim 22 wherein said pairs of acoustical sensors comprise acoustical microphones.

28. The apparatus of claim 20 additionally comprising projectile impact data computation means for calculating projectile impact locations in an orthogonal Cartesian coordinate system.

29. The apparatus of claim 20 additionally comprising means for correcting for velocity dependent variations in projectile shock front characteristics.

30. A remote sensing method comprising the steps of:
a) surrounding a projectile target with a sensor array for sensing a supersonic shock cone prior to a projectile impacting a target, the sensor array comprising at least two pairs of independent orthogonally matched acoustical sensors for detecting a single point on the trajectory of the projectile from a single circular wave generated by the supersonic shock cone based on a absolute time differential of each sensor relative to the center of the sensor array;
b) computing projectile impact data;
c) transmitting the data;
c) receiving the data at a controller; and
e) displaying information corresponding to the data.

31. The method of claim 30 wherein transmitting and receiving is done by RF.

32. The method of claim 31 wherein transmitting and receiving occurs at a frequency of between approximately 902 and 928 MHz.

33. The method of claim 31 wherein receiving occurs at a controller comprising RF Faraday cage shielding.

34. The method of claim 30 wherein transmitting and receiving comprising avoiding collisions to permit multiple sensor arrays to operate in a vicinity of one another.

35. The method of claim 30 wherein displaying comprises graphically simulating a target and projectile impact locations thereon.

36. The method of claim 35 wherein displaying occurs in real-time.

37. The method of claim 30 wherein computing comprises the step of calculating projectile impact locations within twelve inches of a center of the projectile target to an average RMS accuracy of less than approximately fifty thousandths of an inch.

38. The method of claim 30 wherein computing comprises the step of calculating projectile impact locations in an orthogonal Cartesian coordinate system.

39. The method of claim 30 further comprising the step of determining velocity of the projectile.

40. The method of claim 39 wherein determining velocity comprises employing an additional sensor at a predetermined distance from the sensor array which measures a difference in time between the projectile passing the additional sensor and the sensor array.

41. The method of claim 30 additionally comprising the step of correcting for velocity dependent variations in projectile shock front characteristics.

42. The method of claim 30 additionally comprising the step of correcting for data display translation, rotation, and resolution differences with respect to the projectile target and the sensor array.

43. The method of claim 30 wherein the surrounding step comprises providing two pairs of acoustical transducers placed in a plane at cardinal compass points of the projectile target.

44. The method of claim 43 wherein in the surrounding step the pairs of acoustical sensors comprise an additional acoustical transducer orthogonal to the two pairs.

45. The method of claim 44 wherein computing comprises the step of computing projectile velocity from data provided by the additional acoustical transducer and a paired acoustical transducer.

46. The method of claim 30 wherein in the surrounding step each of the sensors is located within an elbow of a housing.

47. The method of claim 46 wherein in the surrounding step the housing comprises arms connecting the elbows, which arms and elbows are modular.

48. The method of claim 30 wherein in the surrounding step the pairs of acoustical sensors comprise acoustical microphones.

49. A sensor method for a projectile target, for detecting a single point on the trajectory of the projectile from a single circular wave generated by the supersonic shock cone prior to a projectile impacting a target based on a absolute time differential of each sensor relative to the center of the sensor array, the method comprising calculating supersonic projectile impact locations within twelve inches of a center of the projectile target to an average RMS accuracy of less than approximately fifty thousandths of an inch.

50. The method of claim 49 additionally comprising the step of surrounding a projectile target with a sensor array comprising at least two independent orthogonally matched acoustical sensors.

51. The method of claim 50 wherein in the surrounding step the sensor array comprises at least two pairs of independent orthogonally matched acoustical sensors.

52. The method of claim 51 wherein in the surrounding step the pairs of acoustical sensors comprise two pairs of acoustical transducers placed in a plane at cardinal compass points of the projectile target.

53. The method of claim 51 wherein in the surrounding step the pairs of acoustical sensors comprise an additional acoustical transducer orthogonal to the two pairs.

54. The method of claim 53 wherein the calculating step comprises computing projectile velocity from data provided by the additional acoustical transducer and a paired acoustical transducer.

55. The method of claim 52 wherein in the surrounding step the sensors of the two pairs of acoustical sensors are located within four elbows of a diamond-shaped housing.

56. The method of claim 51 wherein in the surrounding step the pairs of acoustical sensors comprise acoustical microphones.

57. The method of claim 49 wherein calculating comprises calculating projectile impact locations in an orthogonal Cartesian coordinate system.

58. The method of claim 49 additionally comprising the step of correcting for velocity dependent variations in projectile shock front characteristics.

* * * * *